United States Patent
Huang et al.

(10) Patent No.: US 11,096,219 B2
(45) Date of Patent: Aug. 17, 2021

(54) METHOD AND APPARATUS FOR BEAM INDICATION FOR DATA TRANSMISSION IN A WIRELESS COMMUNICATION SYSTEM

(71) Applicant: ASUSTek Computer Inc., Taipei (TW)

(72) Inventors: Chun-Wei Huang, Taipei (TW); Jia-Hong Liou, Taipei (TW)

(73) Assignee: ASUSTek Computer Inc., Taipei (TW)

(*) Notice: Subject to any disclaimer, the term of this patent is extended or adjusted under 35 U.S.C. 154(b) by 349 days.

(21) Appl. No.: 16/382,996

(22) Filed: Apr. 12, 2019

(65) Prior Publication Data
US 2019/0320469 A1 Oct. 17, 2019

Related U.S. Application Data

(60) Provisional application No. 62/657,399, filed on Apr. 13, 2018.

(51) Int. Cl.
*H04W 74/08* (2009.01)
*H04B 7/0456* (2017.01)
(Continued)

(52) U.S. Cl.
CPC ...... *H04W 74/0833* (2013.01); *H04B 7/0456* (2013.01); *H04W 72/1268* (2013.01); *H04W 72/14* (2013.01)

(58) Field of Classification Search
None
See application file for complete search history.

(56) References Cited

U.S. PATENT DOCUMENTS 9,973,315 B2 5/2018 Han et al.
2019/0190582 A1* 6/2019 Guo .................... H04B 7/0695
(Continued)

FOREIGN PATENT DOCUMENTS

WO WO2017162205 A1 9/2017

*Primary Examiner* — Kodzovi Acolatse
(74) *Attorney, Agent, or Firm* — Blue Capital Law Firm, P.C.

(57) ABSTRACT

A method and apparatus are disclosed from the perspective of a UE. In one embodiment, the method includes the UE receiving a first configuration for PUSCH transmission with configured grant, wherein the first configuration indicates a first SRI value, and the first SRI value is associated with a first reference signal. The method also includes the UE transmitting a first PUSCH with configured grant by using a transmission precoder or a spatial filter, wherein the transmission precoder or the spatial filter is for transmitting the first reference signal. The method further includes the UE transmitting, in response to detecting beam failure recovery, a RA preamble on a PRACH resource for beam failure recovery, wherein the PRACH resource is associated with a candidate reference signal. In addition, the method includes the UE monitoring and/or receiving a response corresponding to the RA preamble via one or more antenna port quasi co-location parameters associated with the candidate reference signal during the BFR procedure. Furthermore, the method includes the UE transmitting, if the UE receives the response, a second PUSCH with configured grant on occasions configured in the first configuration via using the same transmission precoder or spatial filter for transmitting the PRACH resource until the UE receives a second configuration comprising SRI for PUSCH transmission with configured grant.

18 Claims, 17 Drawing Sheets

(51) Int. Cl.
*H04W 72/12* (2009.01)
*H04W 72/14* (2009.01)

(56) References Cited

U.S. PATENT DOCUMENTS

| | | | |
|---|---|---|---|
| 2019/0223205 A1* | 7/2019 | Papasakellariou | H04L 5/00 |
| 2019/0253986 A1* | 8/2019 | Jeon | H04W 72/042 |
| 2020/0178239 A1* | 6/2020 | Yi | H04W 16/28 |
| 2021/0058910 A1* | 2/2021 | Yokomakura | H04L 5/0048 |
| 2021/0144715 A1* | 5/2021 | Gotoh | H04L 1/0004 |

* cited by examiner

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

FIG. 5 (PRIOR ART)

METHOD AND APPARATUS FOR BEAM INDICATION FOR DATA TRANSMISSION IN A WIRELESS COMMUNICATION SYSTEM

CROSS-REFERENCE TO RELATED APPLICATIONS

The present application claims the benefit of U.S. Provisional Patent Application Ser. No. 62/657,399 filed on Apr. 13, 2018, the entire disclosure of which is incorporated herein in its entirety by reference.

FIELD

This disclosure generally relates to wireless communication networks, and more particularly, to a method and apparatus for beam indication for data transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes the UE receiving a first configuration for PUSCH (Physical Uplink Shared Channel) transmission with configured grant, wherein the first configuration indicates a first sounding reference signal (SRS) resource indicator value, and the first SRS resource indicator (SRI) value is associated with a first reference signal. The method also includes the UE transmitting a first PUSCH with configured grant by using a transmission precoder or a spatial filter, wherein the transmission precoder or the spatial filter is for transmitting the first reference signal. The method further includes the UE transmitting, in response to detecting beam failure recovery, a RA (Random Access) preamble on a PRACH (Physical Random Access Channel) resource for beam failure recovery, wherein the PRACH resource is associated with a candidate reference signal. In addition, the method includes the UE monitoring and/or receiving a response corresponding to the RA preamble via one or more antenna port quasi co-location parameters associated with the candidate reference signal during the BFR (Beam Failure Recovery) procedure. Furthermore, the method includes the UE transmitting, if the UE receives the response, a second PUSCH with configured grant on occasions configured in the first configuration via using the same transmission precoder or spatial filter for transmitting the PRACH resource until the UE receives a second configuration comprising SRI for PUSCH transmission with configured grant.

BRIEF DESCRIPTION OF THE DRAWINGS

FIG. 5 is a reproduction of Table 7.3.1-1 of 3GPP R1-1803553.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: Final Chairman's Note of 3GPP TSG RAN WG1 Meeting #90bis (Prague, CZ, 9-13 Oct. 2017) (updated with email approvals); Final Chairman's Note of 3GPP TSG RAN WG1 Meeting #91 (Reno, USA, 27 Nov.-1 Dec. 2017); Final Chairman's Note of 3GPP TSG RAN WG1 Meeting AH1801 (Vancouver, Canada, 22-26 Jan. 2018); Final Chairman's Note of 3GPP TSG RAN WG1 Meeting #92 (Athens, Greece, Feburary 26-Mar. 2, 2018); R1-1803555, "draft CR to 38.214 capturing the Jan18 ad-hoc and RAN1 #92 meeting agreements"; R1-1803554, "CR to 38.213 capturing the NR ad-hoc 1801 and RAN1 #92 meeting agreements"; R1-1803553, "CR to 38.212 capturing the Jan18 ad-hoc and RAN1 #92 meeting agreements"; and R2-1804572, "Miscellaneous corrections". The standards and documents listed above are hereby expressly incorporated by reference in their entirety.

Figure 1:
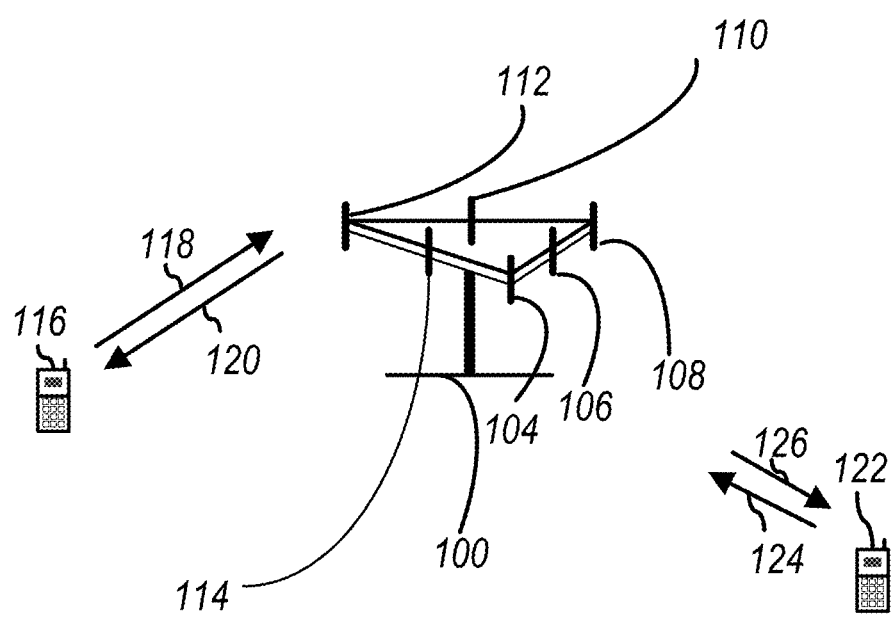
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
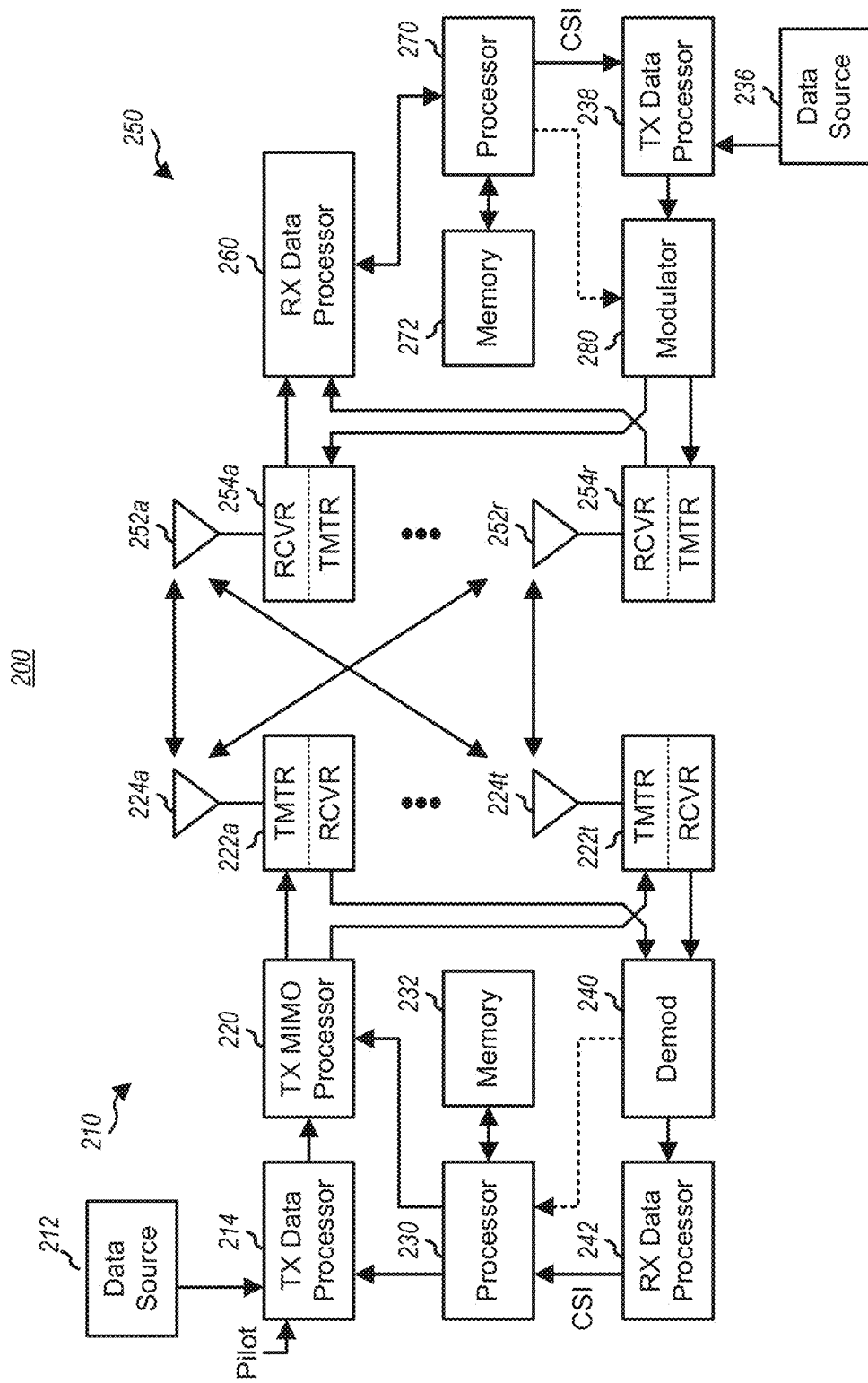
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
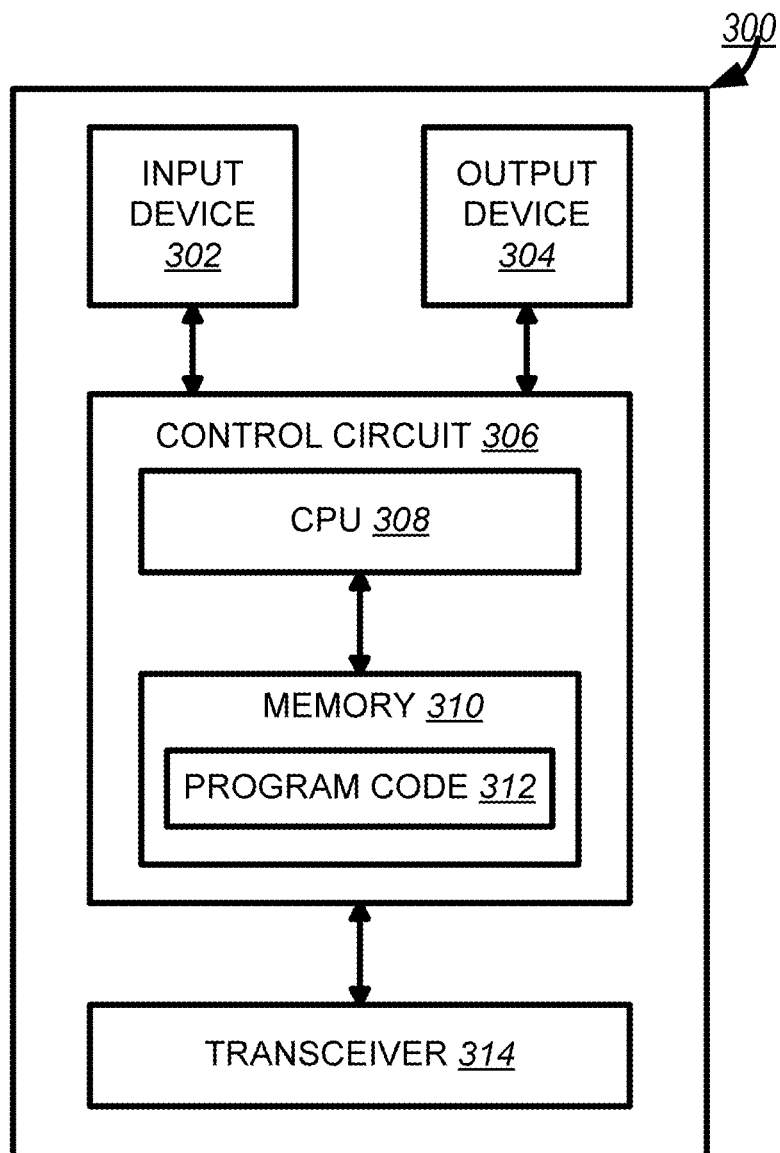
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
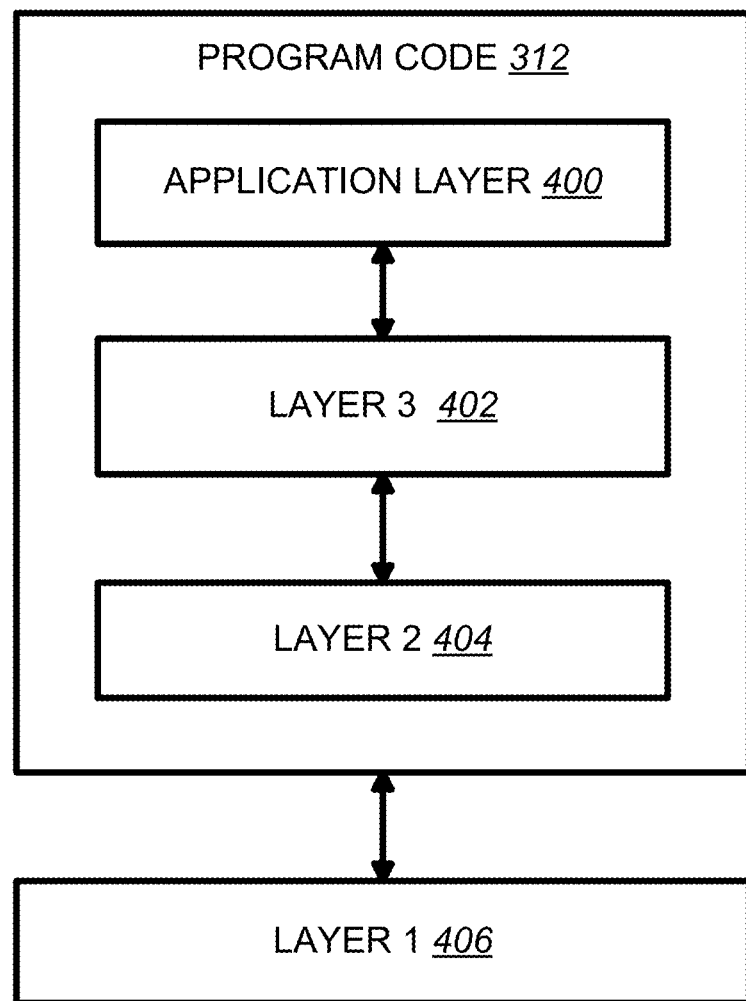
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In the RAN1 #90bis meeting, some agreements related to beam failure recovery are described in the Final Chairman's Note of 3GPP TSG RAN WG1 Meeting #90bis (Prague, CZ, 9-13 Oct. 2017) (updated with email approvals) as follows:

Agreement:
gNB response is transmitted via a PDCCH addressed to C-RNTI
Dedicated CORESET(s) is applied for monitoring gNB response for BFRQ.

Agreement:
Specification supports the CSI-RS+SS block case for the purpose of new candidate beam identification
The above case is configured by gNB Working Assumption:
Beam failure detection is determined based on the following quality measure: Hypothetical PDCCH BLER Proposal:
A beam recovery request can be transmitted if the number of consecutive detected beam failure instance exceeds a configured maximum number
  (Working assumption) If hypothetical PDCCH BLER is above a threshold, it is counted as beam failure instance
    Note: Beam failure is determined when all serving beams fail
  The candidate beam can be identified when metric X of candidate beam is higher than a threshold
    1 or 2 threshold values are introduced
      If 2 thresholds are introduced, one is for SSB and the other is for CSI-RS Agreement:
For gNB to uniquely identify UE identity from a beam failure recovery request transmission
  A PRACH sequence is configured to UE Agreements:
Support RRC configuration of a time duration for a time window and a dedicated CORESET for a UE to monitor gNB response for beam failure recovery request.
  UE assumes that the dedicated CORESET is spatial QCL'ed with DL RS of the UE-identified candidate beam in the beam failure recovery request.

Agreements:
At least support following periodicities of resources for UL transmission without UL grant

| Subcarrier spacing (kHz) | Supported periodicities [ms] |
| --- | --- |
| 15 | 2 symbols, 7 symbols, 1, 2, 5, 10, 20, 32, 40, 64, 80, 128, 160, 320, 640 |
| 30 | 2 symbols, 7 symbols, 0.5, 1, 2, 5, 10, 20, 32, 40, 64, 80, 128, 160, 320, 640 |
| 60 | 2 symbols, 7 symbols (6 symbols for ECP), 0.25, 0.5, 1, 2, 5, 10, 20,, 32, 40, 64, 80, 128, 160, 320, 640 |
| 120 | 2 symbols, 7 symbols, 0.125, 0.25, 0.5, 1, 2, 5, 10, 20, 32, 40, 64, 80, 128, 160, 320, 640 |

Agreements:
For Type 1 and Type 2 UL transmission without grant, RNTI(s) is/are configured by UE-specific RRC signaling.
Within each type, an RNTI is configured by UE-specific RRC signaling at least for one resource configuration in a serving cell In the RAN1 #91 meeting, some agreements regarding to beam failure recovery and/or DL SPS and/or UL transmission without grant (configured grant) are described in the Final Chairman's Note of 3GPP TSG RAN WG1 Meeting #91 (Reno, USA, 27 Nov.-1 Dec. 2017) as follows:

Agreement:
For a UE, only periodic CSI-RS or SSB which is spatially QCL'ed with PDCCH DMRS is used for beam failure detection
  Support explicit configuration for the periodic CSI-RS for beam failure detection
  If this configuration is not made, the default mode is the following:
    UE expects at least one of periodic CSI-RS or SSB is spatially QCL'ed to PDCCH DMRS Agreement:
The measurement metric for candidate beam selection is L1-RSRP
  An RRC parameter is introduced to configure the threshold value for L1-RSRP based on CSI-RS
  Another threshold can be implicitly derived for L1-RSRP based on SSB Agreement
The BLER used for beam failure recovery reuses RLM default BLER threshold for RLM out-of-sync declaration Agreement
The starting point of the observation window of gNB response to beam failure recovery request transmission is 4 slots Agreements:
Activation and deactivation signaling for Type 2 UL transmission without UL grant/DL SPS is differentiated by different values of two fields in the DCI.

In the RAN1 adhoc #1801 meeting, some agreements related to beam failure recovery and/or DL SPS and/or UL transmission without grant (configured grant) are described in the Final Chairman's Note of 3GPP TSG RAN WG1 Meeting #91 (Vancouver, Canada, 22-26 Jan. 2018) as follows:

Agreement:
For beam failure detection model, PHY performs detection of beam failure instances, and indicates a flag to higher layer if a beam failure instance is detected Agreement:

Change candidate beam selection model to the following alternatives:

PHY performs L1-RSRP evaluation of each candidate new beam, provides to higher layer the subset of {beam RS index, L1-RSRP measurements} that satisfies the L1-RSRP threshold RAN 1 expects higher layer to perform new candidate beam selection based on the subset of {beam RS index, RSRP measurements}

Agreement:

PHY provides to higher layer one or more sets of {beam RS index, L1-RSRP measurement} that satisfies the L1-RSRP threshold upon higher layer request.

Agreements:

For both configured grant Type 1 and Type 2 UL transmissions, a UE can be configured with the following parameter by UE-specific RRC signaling separately from the corresponding RRC parameter for grant-based transmission:

FrequencyHopping: ENUMERATED {mode1, mode2} dmrs-Type: ENUMERATED {type1, type2} dmrs-AdditionalPosition: ENUMERATED {pos0, pos1, pos2, pos3} phaseTracking-RS

DMRSLength: ENUMERATED {len1, len2}

Note: original parameter is called "maxLength" in PUSCH-Config., while if maxLength is configured as lent, single-symbol or double-symbol DM-RS can dynamically indicated by DCI. For configured grant Type 1, the length for DMRS should be configured either len1 or len2.

scramblingID BIT STRING (SIZE (16)) for cp-OFDM

For dft-S-OFDM:

nDMRS-CSH-Identity: INTEGER(0 . . . 1007)

nPUSCH-Identity: INTEGER(0 . . . 1007)

disableSequenceGroupHopping: ENUMERATED {disabled} sequenceHoppingEnabled: ENUMERATED {enabled} activateDMRS-WithOCC: ENUMERATED {enabled} cyclicShift: INTEGER (0 . . . 7)

groupAssignmentPUSCH: INTEGER (0 . . . 29)

mcs-Table: ENUMERATED {64QAM, 256QAM} mcs-TableTransformPrecoder: ENUMERATED {64QAM, 256QAM} uci-on-PUSCH: CHOICE {dynamic EQUENCE (SIZE (1 . . . 4)) OF BetaOffsets, semiStatic BetaOffsets} }

UCI on PUSCH for configured grant is supported. Dropping/multiplexing rules for UCI to be further discussed.

Note: For Type 1 UL data transmission without grant, "uci-on-PUSCH" should be "semiStatic BetaOffsets"

resourceAllocation: CHOICE {resourceAllocation-Type0, resourceAllocationType1, dynamicSwitch}

Note: For Type 1 UL data transmission without grant, "resourceAllocation" should be semiStatic "resourceAllocationType0" or "resourceAllocationType1"

rbg-Size: ENUMERATED {config1, config2}

Note: rbg-size is used when the transformPrecoder parameter is disabled

Agreements:

For configured grant Type 1, following RRC parameters are updated as following:

timeDomainOffset: INTEGER (0 . . . 5119)

Note: Indicating the offset in unit of a slot for a given numerology and a given periodicity timeDomainAllocation: any one of valid combinations of start symbol and length and PUSCH mapping type that are specified for uplink grant-based transmission frequencyDomainAllocation: 18 bits Note: Indicating resource allocation as the same way in grant-based PUSCH for a given resourceAllocation-Type UL-TWG-DMRS: split into four parameters {Precoding information and number of layers, Antenna ports, and DMRS_seq_intialization, SRS resource indicator}

Antenna ports: 5 bits

DMRS_seq_initialization: 1 bit

Note: Present only when transform-precoding is disabled.

Precoding information and number of layers: 6 bits

SRS resource indicator: 4 bits

UL-TWG-hopping

"Disabled" is deleted

Frequency-hopping-offset: the same range as grant-based case

3GPP R1-1803555 describes the procedure of resource allocation for uplink transmission with configured grant as follows:

5.1.5 Antenna Ports Quasi Co-Location

The UE can be configured with up to M TCI-States by higher layer signalling to decode PDSCH according to a detected PDCCH with DCI intended for the UE and the given serving cell, where M depends on the UE capability. Each configured TCI state includes one RS set TCI-RS-SetConfig. Each TCI-RS-SetConfig contains parameters for configuring quasi co-location relationship between the reference signals in the RS set and the DM-RS port group of the PDSCH. The RS set contains a reference to either one or two DL RSs and an associated quasi co-location type (QCL-Type) for each one configured by the higher layer parameter QCL-Type. For the case of two DL RSs, the QCL types shall not be the same, regardless of whether the references are to the same DL RS or different DL RSs. The quasi co-location types indicated to the UE are based on the higher layer parameter QCL-Type and may take one or a combination of the following types:

'QCL-TypeA': {Doppler shift, Doppler spread, average delay, delay spread}

'QCL-TypeB': {Doppler shift, Doppler spread}

'QCL-TypeC': {average delay, Doppler shift}

'QCL-TypeD': {Spatial Rx parameter}

The UE receives an activation command [10, TS 38.321] used to map up to 8 TCI states to the codepoints of the DCI field 'Transmission Configuration Indication'. After a UE receives [initial] higher layer configuration of TCI states and before reception of the activation command, the UE may assume that the antenna ports of one DM-RS port group of PDSCH of a serving cell are spatially quasi co-located with the SSB determined in the initial access procedure with respect to Doppler shift, Doppler spread, average delay, delay spread, spatial Rx parameters, where applicable.

If a UE is configured with the higher layer parameter TCI-PresentInDCI that is set as 'Enabled' for the CORESET scheduling the PDSCH, the UE assumes that the TCI field is present in the DL DCI of the PDCCH transmitted on the CORESET. If TCI-PresentInDCI is set as 'Disabled' for the CORESET scheduling the PDSCH or the PDSCH is scheduled by a DCI format 1_0, for determining PDSCH antenna port quasi co-location, the UE assumes that the TCI state for the PDSCH is identical to the TCI state applied for the CORESET used for the PDCCH transmission.

If the TCI-PresentinDCI is set as 'Enabled', the UE shall use the TCI-States according to the value of the 'Transmission Configuration Indication' field in the detected PDCCH with DCI for determining PDSCH antenna port quasi co-location. The UE may assume that the antenna ports of one DM-RS port group of PDSCH of a serving cell are quasi co-located with the RS(s) in the RS set with respect to the QCL type parameter(s) given by the indicated TCI state if the time offset between the reception of the DL DCI and the corresponding PDSCH is equal to or greater than a threshold Threshold-Sched-Offset, where the threshold is based on UE capability. For both the cases when TCI-PresentInDCI='Enabled' and TCI-PresentInDCI='Disabled', if the offset between the reception of the DL DCI and the corresponding PDSCH is less than the threshold Threshold-Sched-Offset, the UE may assume that the antenna ports of one DM-RS port group of PDSCH of a serving cell are quasi co-located based on the TCI state used for PDCCH quasi co-location indication of the lowest CORESET-ID in the latest slot in which one or more CORESETs are configured for the UE. If all configured TCI states do not contain 'QCL-TypeD', the UE shall obtain the other QCL assumptions from the indicated TCI states for its scheduled PDSCH irrespective of the time offset between the reception of the DL DCI and the corresponding PDSCH.

A UE should expect only the following QCL-Type configurations in TCI-RS-Set:
- If a CSI-RS resource is in a CSI-RS resource set configured with higher layer parameter TRS-Info, the UE should only expect 'QCL-TypeC' or {'QCL-TypeC' and 'QCL-TypeD'} configurations with SS/PBCH block or 'QCL-TypeD' with a CSI-RS resource in a CSI-RS resource set configured with higher layer parameter CSI-RS-ResourceRep.
- If a CSI-RS resource is in a CSI-RS resource set configured without higher layer parameter TRS-Info and without CSI-RS-ResourceRep, the UE should only expect 'QCL-TypeA' or 'QCL-TypeB' configuration with a CSI-RS resource in a CSI-RS resource set configured with higher layer parameter TRS-Info or 'QCL-TypeD' with a CSI-RS resource in a CSI-RS resource set configured with higher layer parameter CSI-RS-ResourceRep.
- If a CSI-RS resource in a CSI-RS resource set is configured with higher layer parameter CSI-RS-ResourceRep, the UE should only expect 'QCL-TypeA' configuration with CSI-RS in a CSI-RS resource set configured with higher layer parameter TRS-Info or {'QCL-TypeC' and 'QCL-TypeD'} configurations with SS/PBCH block or {QCL-TypeD} with a CSI-RS resource in a CSI-RS resource set configured with higher layer parameter CSI-RS-ResourceRep . . .
- For the DM-RS of CORESET scheduling the PDSCH, the UE should only expect 'QCL-TypeA' configuration with a CSI-RS resource in a CSI-RS resource set configured with higher layer parameter TRS-Info or {'QCL-TypeA' and 'QCL-TypeD'} configuration with SS/PBCH block if UE is not configured with CSI-RS in a CSI-RS resource set configured with higher layer parameter TRS-Info or 'QCL-TypeD' with a CSI-RS resource in a CSI-RS resource set configured with higher layer parameter CSI-RS-ResourceRep.
- For the DM-RS of PDSCH, the UE should only expect 'QCL-TypeA' configuration with a CSI-RS resource in a CSI-RS resource set configured without higher layer parameter TRS-Info and without CSI-RS-ResourceRep or 'QCL-TypeA' configuration with a CSI-RS resource in a CSI-RS resource set configured with higher layer parameter TRS-Info or {'QCL-TypeA' and 'QCL-TypeD'} configuration with SS/PBCH block if UE is not configured with a CSI-RS resource in a CSI-RS resource set with higher layer parameter TRS-Info or 'QCL-TypeD' with a CSI-RS resource in a CSI-RS resource set configured with higher layer parameter CSI-RS-ResourceRep or {'QCL-TypeA' and 'QCL-TypeD'} configuration with CSI-RS resource in a CSI-RS resource set configured without higher layer parameter TRS-Info and without CSI-RS-ResourceRep.

[ . . . ]

6.1 UE Procedure for Transmitting the Physical Uplink Shared Channel

PUSCH transmission(s) can be dynamically scheduled by an UL grant in a DCI, or semi-statically configured to operate according to Subclause 6.1.2.3 and according to Subclause 5.8.2 of [10, TS 38.321] upon the reception of higher layer parameter of UL-TWG-type1 without the detection of an UL grant in a DCI, or semi-persistently scheduled by an UL grant in a DCI after the reception of higher layer parameter of UL-TWG-type2.

6.1.1 Transmission Schemes

Two transmission schemes are supported for PUSCH: codebook based transmission and non-codebook based transmission.[ . . . ]

6.1.1.1 Codebook Based UL Transmission

For codebook based transmission, the UE determines its PUSCH transmission precoder based on SRI, TRI and TPMI fields from the DCI, where the TPMI is used to indicate the preferred precoder over the SRS ports in the selected SRS resource by the SRI when multiple SRS resources are configured, or if a single SRS resource is configured TPMI is used to indicate the preferred precoder over the SRS ports. The transmission precoder is selected from the uplink codebook, as defined in Subclause 6.3.1.5 of [4, TS 38.211]. When the UE is configured with the higher layer parameter ulTxConfig set to 'Codebook', the UE is configured with at least one SRS resource. The indicated SRI in slot n is associated with the most recent transmission of SRS resource identified by the SRI, where the SRS resource is prior to the PDCCH carrying the SRI before slot n.

6.1.1.2 Non-Codebook Based UL Transmission

For non-codebook based transmission, the UE can determine its PUSCH precoder and transmission rank based on the wideband SRI field from the DCI. The UE shall use one or multiple SRS resources for SRS transmission, where the number of SRS resources which can be configured to the UE for simultaneously transmission in the same RBs is being part of UE capability signalling Only one SRS port for each SRS resource is configured. Only one SRS resource set can be configured with higher layer parameter srsSetUse set to 'nonCodebook'. The maximum number of SRS resources that can be configured for non-codebook based uplink transmission is 4. The indicated SRI in slot n is associated with the most recent transmission of SRS resource identified by the SRI, where the SRS resource is prior to the PDCCH carrying the SRI before slot n.

6.1.2.3 Resource Allocation for Uplink Transmission with Configured Grant

When PUSCH resource allocation is semi-statically configured by higher layer parameter ConfiguredGrantConfig, and the PUSCH transmission corresponding to the configured grant triggered, the following higher layer parameters are applied in the transmission:

For both Type 1 and Type 2 PUSCH transmissions with a configured grant: [RRC IE name]

For Type 1 PUSCH transmissions with a configured grant:
  The row index of an RRC configured table pusch-symbolAllocation is determined by the higher layer parameter timeDomainAllocation, indicating a combination of start symbol and length and PUSCH mapping type;
  Frequency domain resource allocation is determined by the higher layer parameter frequencyDomainAllocation according to the procedure in Subclause 6.1.2.2 for a given resource allocation type indicated by resourceAllocation;
  The $I_{MCS}$ is provided by higher layer parameter mcsAndTBS;
  Number of DM-RS CDM groups, DM-RS ports, SRS resource indication and DM-RS sequence initialization are determined as in Subclause 7.3.1.1 of [5, TS 38.212], and the antenna port value, the bit value for DM-RS sequence initialization, precoding information and number of layers, SRS resource indicator are provided by UL-TWG-DMRS;
  When frequency hopping is enabled, the frequency offset between two frequency hops can be configured by higher layer parameter Frequency-hopping-offset.

For Type 2 PUSCH transmissions with a configured grant:
  the resource allocation follows the higher layer configuration and UL grant received on the DCI according to [10, TS 38.321].

The UE shall not transmit anything on the resources configured by ConfiguredGrantConfig if the higher layers did not deliver a transport block to transmit on the resources allocated for uplink transmission without grant.

A set of allowed periodicities P are defined in [12, TS 38.331].

6.1.3 UE Procedure for Applying Transform Precoding on PUSCH

For Msg3 PUSCH transmission, the UE shall consider the transform precoding either enabled or disabled according to the higher layer configured parameter msg3-tp.

For PUSCH transmission scheduled with a DCI:
  If the DCI with the scheduling grant was received with DCI format 0_0, the UE shall, for this PUSCH transmission, consider the transform precoding either enabled or disabled according to the higher layer configured parameter msg3-tp.
  If the DCI with the scheduling grant was not received with DCI format 0_0
    If the UE is configured with the higher layer parameter [transform-precoding-scheduled], the UE shall, for this PUSCH transmission, consider the transform precoding either enabled or disabled according to this parameter.
    If the UE is not configured with the higher layer parameter [transform-precoding-scheduled], the UE shall, for this PUSCH transmission, consider the transform precoding either enabled or disabled according to the higher layer configured parameter msg3-tp.

For PUSCH transmission without grant
  If the UE is configured with the higher layer parameter [transform-precoding-TWG], the UE shall, for this PUSCH transmission, consider the transform precoding either enabled or disabled according to this parameter.
  If the UE is not configured with the higher layer parameter [transform-precoding-TWG], the UE shall, for this PUSCH transmission, consider the transform precoding either enabled or disabled according to the higher layer configured parameter msg3-tp.

3GPP R1-1803554 describes the procedures related to link configuration as follows:

Link Reconfiguration Procedures

A UE can be configured, for a serving cell, with a set $\bar{q}_0$ of periodic CSI-RS resource configuration indexes by higher layer parameter Beam-Failure-Detection-RS-ResourceConfig and with a set $\bar{q}_1$ of CSI-RS resource configuration indexes and/or SS/PBCH block indexes by higher layer parameter Candidate-Beam-RS-List for radio link quality measurements on the serving cell. If the UE is not provided with higher layer parameter Beam-Failure-Detection-RS-ResourceConfig, the UE determines the set $\bar{q}_0$ to include SS/PBCH block indexes and periodic CSI-RS resource configuration indexes with same values as the RS indexes in the RS sets indicated by the TCI states for respective control resource sets that the UE is configured for monitoring PDCCH. The UE expects single port RS in the set $\bar{q}_0$. The thresholds $Q_{out,LR}$ and $Q_{in,LR}$ correspond to the default value of higher layer parameter RLM-IS-OOS-thresholdConfig and Beam-failure-candidate-beam-threshold, respectively. The physical layer in the UE shall assess the radio link quality according to the set $\bar{q}_0$ of resource configurations against the threshold $Q_{out,LR}$ [10, TS 38.133]. For the set $\bar{q}_0$, the UE shall assess the radio link quality only according to periodic CSI-RS resource configurations or SS/PBCH blocks that are quasi co-located, as described in [6, TS 38.214], with the DM-RS of PDCCH receptions DM-RS monitored by the UE. The UE applies the $Q_{in,LR}$ threshold to the L1-RSRP SS/PBCH blocks. The UE applies the $Q_{in,LR}$ threshold to the L1-RSRP for the CSI RS resource after scaling a respective CSI-RS reception power with a value provided by higher layer parameter Pc_SS.

The physical layer in the UE shall, in slots where the radio link quality according to the set $\bar{q}_0$ is assessed, provide an indication to higher layers when the radio link quality for all corresponding resource configurations in the set $\bar{q}_0$ that the UE uses to assess the radio link quality is worse than the threshold $Q_{out,LR}$. The physical layer informs the higher layers when the radio link quality is worse than the threshold $Q_{out,LR}$ with a periodicity determined by the maximum between the shortest periodicity of periodic CSI-RS configurations or SS/PBCH blocks in the set $\bar{q}_0$ and X.

Upon request from higher layers, the UE shall provide to higher layers the periodic CSI-RS configuration indexes and/or SS/PBCH block indexes from the set $\bar{q}_1$ and the corresponding L1-RSRP measurements that are larger than or equal to $Q_{in,LR}$.

A UE is configured with one control resource set by higher layer parameter Beam-failure-Recovery-Response-CORESET and with an associated search space provided by higher layer parameter search-space-config, for monitoring PDCCH in the control resource set. The UE may receive from higher layers, by parameter Beam-failure-recovery-request-RACH-Resource, a configuration for a PRACH transmission. For PRACH transmission in slot n and according to antenna port quasi co-location parameters associated with periodic CSI-RS configuration or SS/PBCH block with index $q_{new}$, the UE monitors PDCCH for detection of a DCI format with CRC scrambled by C-RNTI starting from slot n+4 within a window configured by higher layer parameter Beam-failure-recovery-request-window, and. For PDSCH reception, the UE assumes the same antenna port quasi-collocation parameters as for monitoring PDCCH until the UE receives by higher layers an activation for a TCI state or a parameter TCI-StatesPDCCH. The UE determines the index $q_{new}$ based on TBD.

3GPP R1-1803553 describes multiple kinds of DCI formats and corresponding content as follows:
7.3.1 DCI Formats
The DCI formats defined in table 7.3.1-1 are supported.
[Table 7.3.1-1 of 3GPP R1-1803553, entitled "DCI formats", is reproduced as FIG. 5]

3GPP R1-1804572 describes higher layer procedure related to beam failure recovery (BFR) and random access as follows:
5.1 Random Access Procedure
5.1.1 Random Access Procedure Initialization
[ . . . ]
The following UE variables are used for the Random Access procedure:
PREAMBLE_INDEX;
PREAMBLE_TRANSMISSION_COUNTER;
PREAMBLE_POWER_RAMPING_COUNTER;
PREAMBLE_RECEIVED_TARGET_POWER;
PREAMBLE_BACKOFF;
PCMAX;
TEMPORARY_C-RNTI.
5.1.2 Random Access Resource Selection
The MAC entity shall:
1> if the Random Access procedure was initiated for beam failure recovery (as specified in subclause 5.17); and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the associated SSBs or the CSI-RSs with CSI-RSRP above cfra-csirs-DedicatedRACH-Threshold amongst the associated CSI-RSs is available:
  2> select an SSB with SS-RSRP above rsrp-ThresholdSSB amongst the associated SSBs or a CSI-RS with CSI-RSRP above cfra-csirs-DedicatedRACH-Threshold amongst the associated CSI-RSs;
  2> set the PREAMBLE_INDEX to a ra-PreambleIndex corresponding to the selected SSB or CSI-RS from the set of Random Access Preambles for beam failure recovery request.
1> else:
  2> if at least one of the SSBs with SS-RSRP above rsrp-ThresholdSSB is available:
    1. 3> select an SSB with SS-RSRP above rsrp-ThresholdSSB.
  2> else:
    2. 3> select any SSB.
    3. [ . . . ]
  2> if the association between Random Access Preambles and SSBs is configured:
    4. 3> select a ra-PreambleIndex randomly with equal probability from the Random Access Preambles associated with the selected SSB and the selected Random Access Preambles group.
  2> else:
    5. 3> select a ra-PreambleIndex randomly with equal probability from the Random Access Preambles within the selected Random Access Preambles group.
  2> set the PREAMBLE_INDEX to the selected ra-PreambleIndex.
1> if an SSB is selected above and an association between PRACH occasions and SSBs is configured:
  2> determine the next available PRACH occasion from the PRACH occasions corresponding to the selected SSB permitted by the restrictions given by the ra-ssb-OccasionMaskIndex if configured (the MAC entity may take into account the possible occurrence of measurement gaps when determining the next available PRACH occasion corresponding to the selected SSB).
1> else if a CSI-RS is selected above and an association between PRACH occasions and CSI-RSs is configured:
  2> determine the next available PRACH occasion from the PRACH occasions in ra-OccasionList corresponding to the selected CSI-RS (the MAC entity may take into account the possible occurrence of measurement gaps when determining the next available PRACH occasion corresponding to the selected CSI-RS).
1> else:
  2> determine the next available PRACH occasion (the MAC entity may take into account the possible occurrence of measurement gaps when determining the next available PRACH occasion).
1> perform the Random Access Preamble transmission procedure (see subclause 5.1.3).
5.1.3 Random Access Preamble Transmission
The MAC entity shall, for each Random Access Preamble:
1> if PREAMBLE_TRANSMISSION_COUNTER is greater than one; and
1> if the notification of suspending power ramping counter has not been received from lower layers; and
1> if SSB selected is not changed (i.e. same as the previous Random Access Preamble transmission):
  2> increment PREAMBLE_POWER_RAMPING_COUNTER by 1.
1> set PREAMBLE_RECEIVED_TARGET_POWER to preambleReceivedTargetPower+DELTA_PREAMBLE+(PREAMBLE_POWER_RAMPING_COUNTER-1)×preamblePowerRampingStep;
1> except for contention-free Random Access Preamble for beam failure recovery request, compute the RA-RNTI associated with the PRACH occasion in which the Random Access Preamble is transmitted;
1> instruct the physical layer to transmit the Random Access Preamble using the selected PRACH, corresponding RA-RNTI (if available), PREAMBLE_INDEX and PREAMBLE_RECEIVED_TARGET_POWER.
[ . . . ]
5.1.4 Random Access Response Reception
Once the Random Access Preamble is transmitted and regardless of the possible occurrence of a measurement gap, the MAC entity shall:
1> if the contention-free Random Access Preamble for beam failure recovery request was transmitted by the MAC entity:
  2> start the ra-ResponseWindow configured in BeamFailureRecoveryConfig at the first PDCCH occasion as specified in TS 38.213 [6] from the end of the Random Access Preamble transmission;
2> monitor the PDCCH of the SpCell for response to beam failure recovery request identified by the C-RNTI while ra-ResponseWindow is running.
1> else:
2> start the ra-ResponseWindow configured in RACH-ConfigCommon at the first PDCCH occasion as specified in TS 38.213 [6] from the end of the Random Access Preamble transmission;
2> monitor the PDCCH of the SpCell for Random Access Response(s) identified by the RA-RNTI while the ra-ResponseWindow is running.
1> if notification of a reception of a PDCCH transmission is received from lower layers; and
1> if PDCCH transmission is addressed to the C-RNTI; and
1> if the contention-free Random Access Preamble for beam failure recovery request was transmitted by the MAC entity:
2> consider the Random Access procedure successfully completed.
1> if ra-ResponseWindow configured in RACH-Config-Common expires, and if the Random Access Response containing Random Access Preamble identifiers that matches the transmitted PREAMBLE_INDEX has not been received; or:
1> if ra-Response Window configured in BeamFailureRecoveryConfig expires and if the PDCCH addressed to the C-RNTI has not been received:
2> consider the Random Access Response reception not successful;
2> increment PREAMBLE_TRANSMISSION_COUNTER by 1;
2> if PREAMBLE_TRANSMISSION_COUNTER= preambleTransMax+1:
6. 3> if the Random Access Preamble is transmitted on the SpCell:
4> indicate a Random Access problem to upper layers.
7. 3> else if the Random Access Preamble is transmitted on a SCell:
4> consider the Random Access procedure unsuccessfully completed.
2> if in this Random Access procedure, the Random Access Preamble was selected by MAC among the contention-based Random Access Preambles:
8. 3> select a random backoff time according to a uniform distribution between 0 and the PREAMBLE_BACKOFF;
9. 3> delay the subsequent Random Access Preamble transmission by the backoff time.
2> perform the Random Access Resource selection procedure (see subclause 5.1.2).

The MAC entity may stop ra-Response Window (and hence monitoring for Random Access Response(s)) after successful reception of a Random Access Response containing Random Access Preamble identifiers that matches the transmitted PREAMBLE_INDEX.

HARQ operation is not applicable to the Random Access Response transmission.

5.17 Beam Failure Detection and Recovery Procedure

The MAC entity may be configured by RRC with a beam failure recovery procedure which is used for indicating to the serving gNB of a new SSB or CSI-RS when beam failure is detected on the serving SSB(s)/CSI-RS(s). Beam failure is detected by counting beam failure instance indication from the lower layers to the MAC entity. RRC configures the following parameters in the BeamFailureRecoveryConfig for the Beam Failure Detection and Recovery procedure:
beamFailureInstanceMaxCount for the beam failure detection;
beamFailureDetectionTimer for the beam failure detection;
candidateBeamThreshold: an RSRP threshold for the beam failure recovery;
preamblePowerRampingStep: preamblePowerRampingStep for the beam failure recovery;
preambleReceivedTargetPower: preambleReceivedTargetPower for the beam failure recovery;
preambleTransMax: preambleTransMax for the beam failure recovery;
ra-Response Window: the time window to monitor response(s) for the beam failure recovery using contention-free Random Access Preamble;
prach-ConfigIndex: prach-ConfigIndex for the beam failure recovery;
ra-ssb-OccasionMaskIndex: ra-ssb-OccasionMaskIndex for the beam failure recovery;
ra-OccasionList: ra-OccasionList for the beam failure recovery.

The following UE variables are used for the beam failure detection procedure:
BFI_COUNTER: counter for beam failure instance indication which is initially set to 0. The MAC entity shall:
1> if beam failure instance indication has been received from lower layers:
2> start or restart the beamFailureDetectionTimer;
2> increment BFI_COUNTER by 1;
2> if BFI_COUNTER=beamFailureInstanceMaxCount+1:
1. 3> initiate a Random Access procedure (see subclause 5.1) on the SpCell by applying the parameters configured in BeamFailureRecoveryConfig.
1> if the beamFailureDetectionTimer expires:
2> set BFI_COUNTER to 0.
1> if the Random Access procedure is successfully completed (see subclause 5.1):
2> consider the Beam Failure Recovery procedure successfully completed.

One or multiple of following terminologies may be used hereafter:
BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
TRP: A transmission and reception point provides network coverage and directly communicates with UEs. TRP could also be referred to as distributed unit (DU) or network node.
Cell: A cell is composed of one or multiple associated TRPs, i.e. coverage of the cell is composed of coverage of all associated TRP(s). One cell is controlled by one BS. Cell could also be referred to as TRP group (TRPG).
Serving beam: A serving beam for a UE is a beam generated by a network node, e.g. TRP, which is currently used to communicate with the UE, e.g. for transmission and/or reception.

Candidate beam: A candidate beam for a UE is a candidate of a serving beam. Serving beam may or may not be candidate beam.

In wireless communication system, RS (Reference Signal) or predefined signals are necessary for NW (e.g. BS) and/or UE to perform channel estimation or measurement.

In 5G NR, transmission in high frequency band (i.e. above 6 GHz even to 52.6 GHz) is attractive for people due to wider bandwidth of high frequency. However, there are some impacts on transmission through high frequency band, e.g. transmitted power will decay dramatically. Hence, more and more researches suggest that transmitters or receivers are implemented with beam(s) which is a signal processing technique about allocating power toward a specific direction. A network operating in high frequency band may have multiple beams to support entire coverage. Taking into account the beamforming transmission/reception in high frequency bands, NR supports some mechanisms to support beam indication for downlink and uplink transmission. For example, for downlink transmission, there is a TCI state structure for downlink beam indication. A TCI (Transmission Configuration Indication) state may be present in a downlink scheduling DCI for such purpose. For uplink, an uplink grant may carry a sounding reference signal field or CSI-RS field to indicate the beam for uplink transmission.

As described in 3GPP R1-1803555, a TCI state is associated with one or more reference signal(s) and corresponding QCL type. For example, a UE is indicated with a TCI state in a scheduling DCI, wherein the TCI state is associated with a reference signal and QCL type D, i.e. spatial filter information. In this example, the UE assumes that the antenna ports of one DM-RS port group of scheduled PDSCH are spatially quasi co-located with the associated reference signal. In other words, the UE can use a receiving beam for receiving the scheduled downlink data (i.e. PDSCH) as that for receiving the associated reference signal.

In the current PHY specification (3GPP R1-1803554), UE can be configured to transmit periodical data transmission without scheduling DCI (i.e. type 1 PUSCH transmission with configured grant and/or type 2 PUSCH transmission with configured grant). For type 1 PUSCH (Physical Uplink Shared Channel) transmission with configured grant, since there is no DCI (Downlink Control Information) for indicating SRI (Send Routing Information) field and/or TCI state, UE is configured by NW with a SRI. With a SRI configured by NW, UE would transmit type 1 PUSCH on configured periodical occasion(s) via antenna port quasi co-colocation information derived from the indicated/configured SRI. Regarding to type 2 PUSCH transmission with configured grant, UE may receive a DCI with CRC scrambled by CS-RNTI. The DCI indicates activation of type 2 PUSCH transmission with configured grant. UE would transmit type 2 PUSCH on configured occasion(s), wherein the type 2 PUSCH is transmitted via the antenna port quasi co-location information derived from a SRI indicated by a DCI for activation of type 2 PUSCH transmission with configured grant. A DCI for activation of type 2 PUSCH transmission with configured grant can comprise a SRI field for type 2 PUSCH transmission.

For downlink transmission, UE can be configured to receive periodical data transmission without DCI (i.e. DL-SPS transmission). For DL-SPS (Downlink Semi-Persistent Scheduling) transmission, UE may receive a DCI indicating DL-SPS activation. UE may receive SPS PDSCH on configured occasion(s). UE may assume the SPS PDSCH on the configured occasion(s) is spatially quasi co-located with a reference signal associated with a TCI state indicated by the DCI for DL-SPS activation. A DCI can comprise TCI field indicating a TCI state for (SPS-) PDSCH. If a DCI is not configured with TCI field, UE may assume TCI state of control resource set (CORESET) for (SPS-) PDSCH where the UE receives the DCI.

However, if the TCI state for receiving SPS-PDSCH is changed or reconfigured or invalid, how UE assumes TCI state for receiving SPS PDSCH on configured SPS PDSCH occasion. This issue can be illustrated by FIG. 6. A UE is configured to receive SPS PDSCH periodically. The UE receives a DCI scrambled by CS-RNTI indicating DL SPS activation wherein the DCI indicates a TCI state "000" associated with a reference signal "RS #0". The UE receives SPS PDSCH on a configured occasion by using the antenna port quasi co-colocation information derived from the reference signal "RS #0". If beam failure occurs, the UE triggers beam failure recovery procedure (BFR procedure). For (receiving) the subsequent configured occasion(s) after the beam failure recovery procedure, which TCI state and/or which reference signal assumed by the UE on configured occasion needs to be considered.

A first general concept of this invention is that for a UE, if all TCI states or beams for receiving PDCCH (Physical Downlink Control Channel) of a serving cell are all measured below a threshold, the UE may perform a beam failure recovery procedure. The UE may find a candidate beam reference signal with best measured quality and transmit to the network. After the UE receives the gNB response, the UE may assume the one or more SPS (Semi-Persistent Scheduling) PDSCH (Physical Downlink Shared Channel) transmitted after the receiving the gNB response is spatially quasi co-located with the candidate beam reference signal.

A second general concept of this invention is that for a UE, if all TCI states or beams for receiving PDCCH of a serving cell are all measured below a threshold, the UE may perform a beam failure recovery procedure. The UE may find a candidate beam reference signal with best measured quality and transmit to the network. The UE transmits a RA preamble or beam failure recovery request on a RRACH resource associated with the candidate beam reference signal. After the UE receives the gNB response, the UE may assume the one or more PUSCH with configured grant transmitted after the receiving the gNB response is spatially quasi co-located with the spatial filter/parameter for transmitting the RA preamble.

Embodiment 1

A UE could receive a first semi-persistent scheduling (SPS) PDSCH via assuming the first SPS PDSCH is spatially quasi co-located with a first reference signal. The first reference signal could be associated with a TCI state indicated by a first DCI. In one embodiment, the first DCI could indicate activation command of SPS PDSCH. The first SPS PDSCH could be transmitted in the time domain resource and/or frequency domain resource indicated by the first DCI.

The UE may transmit a random access preamble for beam failure recovery or link reconfiguration. In one embodiment, the UE may receive from higher layers, by parameter Beam-failure-recovery-request-RACH-Resource, a configuration for a PRACH transmission. The random access preamble could be transmitted on a PRACH resource associated with a reference signal with index $q_{new}$. The index $q_{new}$ could be among the periodic CSI-RS configuration indexes and/or SS/PBCH block indexes from the set $\bar{q}_1$ and the corresponding L1-RSRP measurements that are larger than or equal to $Q_{in,LR}$. In one embodiment, the index $q_{new}$ could be selected among the periodic CSI-RS configuration indexes and/or SS/PBCH block indexes from the set $\bar{q}_1$ and the corresponding L1-RSRP measurements that are larger than or equal to $Q_{in,LR}$. In one embodiment, the index $q_{new}$ could be selected by higher layer.

A UE could be configured with one control resource set by higher layer parameter Beam-failure-Recovery-Response-CORESET and with an associated search space provided by higher layer parameter search-space-config. For the random access preamble transmission in slot n and according to antenna port quasi co-location parameters associated with the reference signal, the UE could monitor PDCCH for detection of a DCI format with CRC scrambled by C-RNTI starting from slot n+4 within a window configured by higher layer parameter Beam-failure-recovery-request-window.

In one embodiment, if or after the UE receives the DCI format with CRC scrambled by C-RNTI (Cell Radio Network Temporary Identifier), the UE could receive:
- a second semi-persistent scheduling (SPS) PDSCH via assuming the antenna port quasi co-located information derived from the reference signal until the UE receives a second DCI;
- a second semi-persistent scheduling (SPS) PDSCH via using the same spatial filter for receiving the reference signal until the UE receives a second DCI;
- a second semi-persistent scheduling (SPS) PDSCH on configured occasion via assuming the antenna port quasi co-located information derived from the reference signal until the UE receives a second DCI;
- a second semi-persistent scheduling (SPS) PDSCH on configured occasion via using the same spatial filter for receiving the reference signal until the UE receives a second DCI;
- a second semi-persistent scheduling (SPS) PDSCH in time domain resources and/or frequency domain resources indicated in the first DCI until the UE receives a second DCI;
- a second semi-persistent scheduling (SPS) PDSCH according to at least one field indicated in the first DCI until the UE receives a second DCI, e.g. MCS, RV, time domain assignment, frequency domain assignment, or HARQ process;
- a second semi-persistent scheduling (SPS) PDSCH according to at least one field indicated in the first DCI until the UE receives a second DCI (e.g. MCS, RV, time domain assignment, frequency domain assignment, or HARQ process), except for TCI state field;
- a second semi-persistent scheduling (SPS) PDSCH via using the antenna port quasi co-located information derived from a TCI state indicated in the second DCI; and/or
- a second semi-persistent scheduling (SPS) PDSCH via using the spatial filter derived from a TCI state indicated in the second DCI.

In one embodiment, the second DCI could be transmitted after the DCI format with CRC scrambled by C-RNTI. The second DCI could indicate activation command of SPS PDSCH. The second SPS PDSCH could also be transmitted in the time domain resource and/or frequency domain resource indicated by the second DCI.

In one embodiment, if or after the UE receives the DCI format with CRC scrambled by C-RNTI, the UE may ignore, discard, or release the configuration of DL SPS transmission. If or after the UE declares or detects beam failure occurs or if BFI_COUNTER=beamFailureInstanceMaxCount+1, the UE could ignore, discard, or release the configuration of DL SPS transmission. If or after the UE transmits the random access preamble, the UE could ignore, discard, or release the configuration of DL SPS transmission. If or after the UE receives the DCI format with CRC scrambled by C-RNTI, the UE could ignore, discard, or release the content(s) activated from the first DCI, e.g. frequency domain resource, time domain resource.

In one embodiment, if or after the UE declares or detects beam failure occurs or if BFI_COUNTER=beamFailureInstanceMaxCount+1, the UE could ignore, discard, or release the content(s) activated from the first DCI, e.g. frequency domain resource, time domain resource. If or after the UE transmits the random access preamble, the UE could ignore, discard, or release the content(s) activated from the first DCI, e.g. frequency domain resource, time domain resource. If or after the UE receives the DCI format with CRC scrambled by C-RNTI, the UE could ignore, discard, or release the TCI state value indicated by the first DCI.

In one embodiment, if or after the UE declares or detects beam failure occurs or if BFI_COUNTER=beamFailureInstanceMaxCount+1, the UE could ignore, discard, or release the TCI state value indicated by the first DCI. If or after the UE transmits the random access preamble, the UE could ignore, discard, or release the TCI state value indicated by the first DCI.

In one embodiment, the UE may not receive DL SPS PDSCH on occasion(s) which occurs after the UE receives the DCI format with CRC scrambled by C-RNTI until the UE receives the second DCI. The UE may not be expected to receive DL SPS PDSCH on occasion(s) which occurs after the UE receives the DCI format with CRC scrambled by C-RNTI until the UE receives the second DCI.

Figure 6:
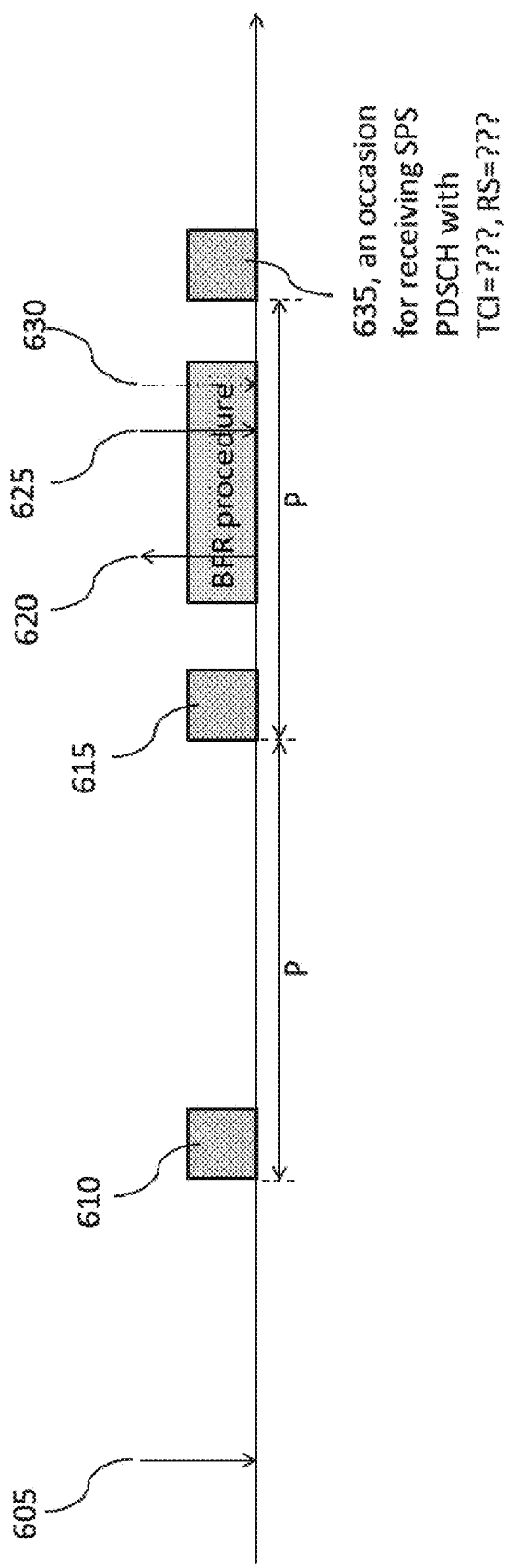
FIG. 6 is a diagram according to one embodiment.

Embodiment 1 can be used to solve, at least but not limited to, an issue illustrated in FIG. 6. In step 605, UE may receive a first DCI scrambled with CS-RNTI indicating activation of DL SPS, wherein the first DCI indicates a TCI state for receiving SPS PDSCH on SPS occasions with periodicity P, e.g. TCI=000 associated with RS #0. In step 610, UE may receive SPS PDSCH via the indicated TCI state on a first SPS occasion. In step 615, UE may receive SPS PDSCH via the indicated TCI state on a second SPS occasion. In step 620, UE may transmit a signal on a resource associated with a reference signal. e.g. RS #1, in response to detecting beam failure. In step 625, UE may receive a response via quasi-co-location information derived from the reference signal. e.g. RS #1. In step 630, UE may receive a second DCI scrambled with CS-RNTI indicating activation of DL SPS before a third SPS occasion. In step 635, UE may determine quasi-co-location information for receiving SPS PDSCH on the third SPS occasion.

For one example to determine quasi-co-location information for receiving SPS PDSCH, as illustrated in FIG. 6, if the UE receives a response via "RS #1" during a BFR procedure, the UE could receive SPS PDSCH via RS #1 on SPS occasion which occurs after the UE receives a gNB response successfully. In the same example, after the UE receives a gNB response successfully, if the UE receives a DCI indicating SPS activation command before the earliest DL SPS occasion, the UE could receive SPS PDSCH on the SPS occasion via a reference signal associated to a TCI state indicated by the DCI.

In one embodiment, the UE could be configured to receive DL SPS PDSCH on configured (SPS) occasion(s) periodically. The UE could receive a signal indicating SPS configuration. SPS configuration could refer to SPS-config. The first DCI may comprise a TCI state field.

In one embodiment, if TCI-PresentInDCI is set as 'Disabled' for a CORESET where the first DCI is transmitted or the first DCI is a DCI format 1_0, for determining PDSCH antenna port quasi co-location, the UE could assume that the TCI state for the first SPS PDSCH is identical to the TCI state applied for the CORESET used for transmitting the first DCI or the second DCI.

Embodiment 2

A UE could receive a first semi-persistent scheduling (SPS) PDSCH via assuming the first SPS PDSCH is spatially quasi co-located with a first reference signal. The first reference signal could be associated with a first TCI state indicated by a first DCI.

In one embodiment, the first DCI could indicate activation command of SPS PDSCH. The first SPS PDSCH could be transmitted in the time domain resource and/or frequency domain resource indicated by the first DCI.

The UE could transmit a random access preamble for beam failure recovery or link reconfiguration. In one embodiment, the UE could receive from higher layers, by parameter Beam-failure-recovery-request-RACH-Resource, a configuration for a PRACH transmission. The random access preamble could be transmitted on a PRACH resource associated with a reference signal with index $q_{new}$. The index $q_{new}$ could be among the periodic CSI-RS configuration indexes and/or SS/PBCH block indexes from the set $\bar{q}_1$ and the corresponding L1-RSRP measurements that are larger than or equal to $Q_{in,LR}$. In one embodiment, the index $q_{new}$ could be selected among the periodic CSI-RS configuration indexes and/or SS/PBCH block indexes from the set $\bar{q}_1$ and the corresponding L1-RSRP measurements that are larger than or equal to $Q_{in,LR}$. In one embodiment, the index could be selected by higher layer.

A UE could be configured with one control resource set by higher layer parameter Beam-failure-Recovery-Response-CORESET and with an associated search space provided by higher layer parameter search-space-config. For the random access preamble transmission in slot n and according to antenna port quasi co-location parameters associated with the reference signal, the UE could monitor PDCCH for detection of a DCI format with CRC scrambled by C-RNTI starting from slot n+4 within a window configured by higher layer parameter Beam-failure-recovery-request-window.

In one embodiment, if or after the UE receives the DCI format with CRC scrambled by C-RNTI, the UE could update the first TCI state such that the first TCI state is associated with the reference signal with index $q_{new}$. The UE could also replace the first reference signal in the first TCI state with the reference signal with index $q_{new}$. Furthermore, the UE could override the first reference signal in the first TCI state with the reference signal with index $q_{new}$.

In one embodiment, if or after the UE receives the DCI format with CRC scrambled by C-RNTI, the UE could receive:
  a second semi-persistent scheduling (SPS) PDSCH in time domain resources and/or frequency domain resources indicated in the first DCI until the UE receives a second DCI; and/or
  a second semi-persistent scheduling (SPS) PDSCH according to at least one field indicated in the first DCI until the UE receives a second DCI, e.g. MCS, RV, time domain assignment, frequency domain assignment, HARQ process, or TCI state field.

In one embodiment, the UE may not receive DL SPS PDSCH on occasion(s) which occurs after the UE receives the DCI format with CRC scrambled by C-RNTI until the UE receives the second DCI. Furthermore, the UE may not be expected to receive DL SPS PDSCH on occasion(s) which occurs after the UE receives the DCI format with CRC scrambled by C-RNTI until the UE receives the second DCI.

Embodiment 2 can be used to solve, at least but not limited to, an issue illustrated in FIG. 6. In step 605, UE may receive a first DCI scrambled with CS-RNTI indicating activation of DL SPS, wherein the first DCI indicates a TCI state for receiving SPS PDSCH on SPS occasions with periodicity P, e.g. TCI=000 associated with RS #0. In step 610, UE may receive SPS PDSCH via the indicated TCI state on a first SPS occasion. In step 615, UE may receive SPS PDSCH via the indicated TCI state on a second SPS occasion. In step 620, UE may transmit a signal on a resource associated with a reference signal. e.g. RS #1, in response to detecting beam failure. In step 625, UE may receive a response via quasi-co-location information derived from the reference signal. e.g. RS #1. In step 630, UE may receive a second DCI scrambled with CS-RNTI indicating activation of DL SPS before a third SPS occasion. In step 635, UE may determine quasi-co-location information for receiving SPS PDSCH on the third SPS occasion.

For one example to determine quasi-co-location information for receiving SPS PDSCH, as shown in FIG. 6, if the UE receives a response via "RS #1" during BFR procedure, the UE could override association between TCI state "000" and "RS #0". In this example, TCI state "000" may be associated with "RS #1" after BFR procedure. The UE could receive SPS PDSCH via RS #1 on SPS occasion which occurs later than BFR procedure.

In one embodiment, after the UE receives the DCI format with CRC scrambled by C-RNTI, the UE could receive:
  a second semi-persistent scheduling (SPS) PDSCH via assuming the antenna port quasi co-located information derived from the reference signal associated with the first TCI state until the UE receives a second DCI;
  a second semi-persistent scheduling (SPS) PDSCH via using the same spatial filter for receiving the reference signal associated with the first TCI state until the UE receives a second DCI;
  a second semi-persistent scheduling (SPS) PDSCH via using the antenna port quasi co-located information derived from a second TCI state indicated in the second DCI; and/or
  a second semi-persistent scheduling (SPS) PDSCH via using spatial filter for receiving a reference signal associated with a second TCI state indicated in the second DCI.

In one embodiment, the second DCI could be transmitted after the DCI format with CRC scrambled by C-RNTI. The second DCI could indicate activation command of SPS PDSCH. The second SPS PDSCH could also be transmitted in the time domain resource and/or frequency domain resource indicated by the second DCI.

For another example to determine quasi-co-location information for receiving SPS PDSCH, as illustrated in FIG. 6, if the UE receives a response via "RS #1" during a BFR procedure, the UE could receive SPS PDSCH via RS #1 on SPS occasion which occurs after the UE receives a gNB response successfully. In the same example, after the UE receives a gNB response successfully, if the UE receives a DCI indicating SPS activation command before the earliest DL SPS occasion, the UE could receive SPS PDSCH on the SPS occasion via a reference signal associated to a TCI state indicated by the DCI.

In one embodiment, the UE could be configured to receive DL SPS PDSCH on configured (SPS) occasion(s) periodically. The UE could receive a signal indicating a SPS configuration. The SPS configuration could be SPS-config. The first DCI could comprise a TCI state field.

In one embodiment, if TCI-PresentInDCI is set as 'Disabled' for a CORESET where the first DCI is transmitted or the first DCI is a DCI format 1_0, for determining PDSCH antenna port quasi co-location, the UE could assume that the TCI state for the first SPS PDSCH is identical to the TCI state applied for the CORESET used for transmitting the first DCI or the second DCI.

Embodiment 3 (Type 1 UL Transmission with Configured Grant after BFR)

A UE could receive a first configuration for PUSCH with configured grant. The UE could transmit a first PUSCH with configured grant via assuming that the first PUSCH with configured grant is spatially quasi co-located with a first reference signal. In one embodiment, the UE could transmit the first PUSCH with configured grant using transmission precoder or spatial filter for transmitting the first reference signal. The first reference signal could be associated with a SRI value indicated by the first configuration. The first PUSCH with configured grant could be transmitted in the time domain resource and/or frequency domain resource indicated by the first configuration.

The UE could transmit a random access preamble for beam failure recovery or link reconfiguration. In one embodiment, the UE could receive from higher layers, by parameter Beam-failure-recovery-request-RACH-Resource, a configuration for a PRACH transmission. The random access preamble could be transmitted on a PRACH resource associated with a reference signal with index $q_{new}$. The index $q_{new}$ could be among the periodic CSI-RS configuration indexes and/or SS/PBCH block indexes from the set $\bar{q}_1$ and the corresponding L1-RSRP measurements that are larger than or equal to $Q_{in,LR}$. In one embodiment, the index $q_{new}$ could be selected among the periodic CSI-RS configuration indexes and/or SS/PBCH block indexes from the set $\bar{q}_1$ and the corresponding L1-RSRP measurements that are larger than or equal to $Q_{in,LR}$. The index $q_{new}$ could be selected by higher layer.

A UE could be configured with one control resource set by higher layer parameter Beam-failure-Recovery-Response-CORESET and with an associated search space provided by higher layer parameter search-space-config. For the random access preamble transmission in slot n and according to antenna port quasi co-location parameters associated with the reference signal, the UE could monitor PDCCH for detection of a DCI format with CRC scrambled by C-RNTI starting from slot n+4 within a window configured by higher layer parameter Beam-failure-recovery-request-window.

In one embodiment, if or after the UE receives the DCI format with CRC scrambled by C-RNTI, the UE could transmit:
  a second PUSCH with configured grant via assuming the antenna port quasi co-located information derived from the random access preamble or the PRACH resource until the UE receives a second configuration; and/or
  a second PUSCH with configured grant via using the same spatial filter for transmitting the random access preamble or the PRACH resource until the UE receives a second configuration;
  a second PUSCH with configured grant with the same transmission precoder for transmitting the random access preamble or the PRACH resource until the UE receives a second configuration; a second PUSCH with configured grant in time domain resources and/or frequency domain resources indicated in the first configuration until the UE receives a second configuration;
  a second PUSCH with configured grant according to at least one higher layer parameter indicated in the first configuration until the UE receives a second configuration, e.g. MCS, RV, time domain assignment, frequency domain assignment, or HARQ process; and/or
  a second PUSCH with configured grant according to at least one field indicated in the first configuration until the UE receives a second configuration (e.g. MCS, RV, time domain assignment, frequency domain assignment, or HARQ process), except for TCI state field.

In one embodiment, if or after the UE receives the DCI format with CRC scrambled by C-RNTI, the UE could assume that at least transmission precoder of a second PUSCH with configured grant is determined based on the random access preamble or the PRACH resource until the UE receives a second configuration.

In one embodiment, if or after the UE receives the DCI format with CRC scrambled by C-RNTI, the UE could ignore, discard, or release the configuration indicated by the first configuration. The UE could also ignore, discard, or release the SRI value indicated by the first configuration.

In one embodiment, if or after the UE declares or detects beam failure occurs or if BFI_COUNTER=beamFailureInstanceMaxCount+1, the UE could ignore, discard, or release the configuration indicated in the first configuration. The UE could also ignore, discard, or release the SRI value indicated in the first configuration.

In one embodiment, if or after the UE transmits the random access preamble, the UE could ignore, discard, or release the configuration indicated in the first configuration. The UE could ignore, discard, or release the SRI value indicated in the first configuration.

In one embodiment, the UE may not transmit PUSCH with configured grant on occasion(s) which occurs after the UE receives the DCI format with CRC scrambled by C-RNTI until the UE receives a second configuration. The UE may not be expected to transmit PUSCH with configured grant on occasion(s) which occurs after the UE receives the DCI format with CRC scrambled by C-RNTI until the UE receives the second configuration.

In one embodiment, the second configuration could be transmitted after the DCI format with CRC scrambled by C-RNTI. If or after the UE receives the second configuration, the UE could transmit:
  a second PUSCH with configured grant via using the antenna port quasi co-located information derived from a SRI value indicated by the second configuration;
  a second PUSCH with configured grant via using the antenna port quasi co-located information derived from a SRI value indicated by the second configuration; and/or
  a second PUSCH with configured grant via using the transmission precoder determined based on a SRI value indicated by the second configuration.

In one embodiment, the second configuration could indicate a (re)configuration for PUSCH with configured grant. The second PUSCH with configured grant could be transmitted in the time domain resource and/or frequency domain resource indicated by the second configuration.

Figure 7:
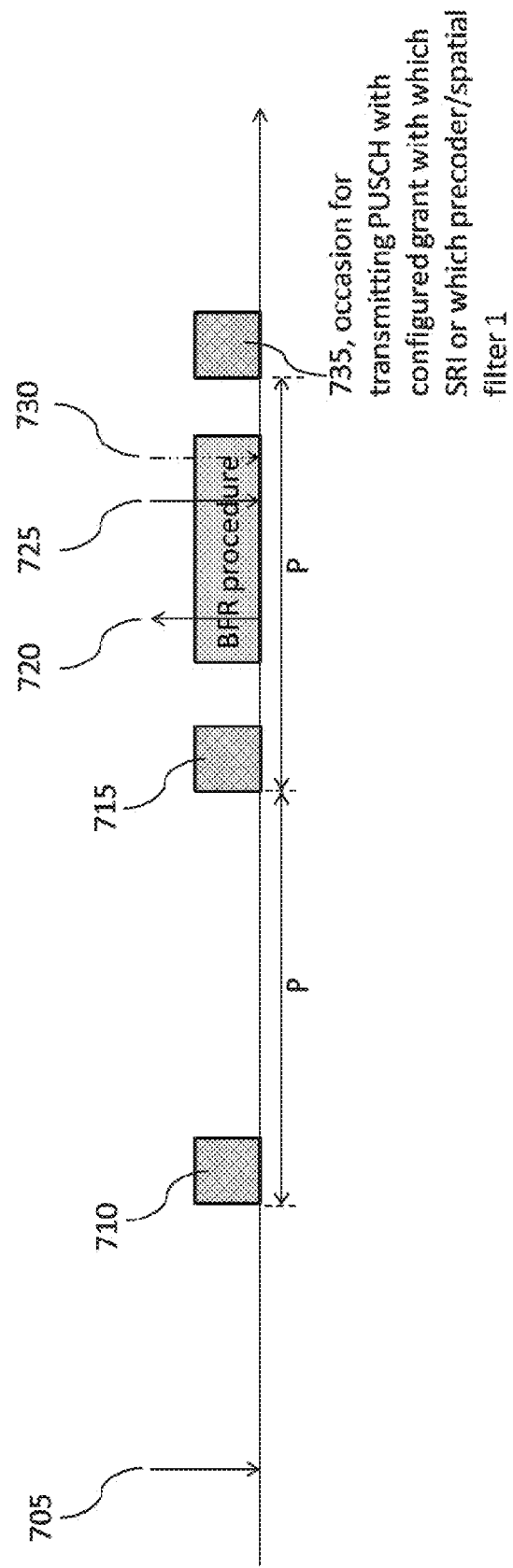
FIG. 7 is a diagram according to one embodiment.

Embodiment 3 can be used to solve, at least but not limited to, an issue illustrated in FIG. 7. In step 705, UE may receive a first configuration of PUSCH with configured grant, wherein the first configuration indicates a SRI value, e.g. "0000". In step 710, UE may transmit PUSCH with configured grant by transmission precoder or spatial filter derived from the indicated SRI value on a first occasion. In step 715, UE may transmit PUSCH with configured grant by transmission precoder or spatial filter derived from the indicated SRI value on a second occasion. In step 720, UE may transmit a signal on a resource associated with a reference signal, in response to detecting beam failure. In step 725, UE may receive a response via quasi-co-location derived from the reference signal. In step 730, UE may receive a second configuration of PUSCH with configured grant before a third occasion. In step 735, UE may determine transmission precoder or spatial filter for transmitting PUSCH with configured grant on the third occasion.

For one example to determine transmission precoder or spatial filter for transmitting PUSCH with configured grant, if the UE triggers BFR procedure during a second occasion and a third occasion for transmitting PUSCH with configured grant, the UE could transmit PUSCH with configured grant on the third occasion via using same transmission precoder or same spatial filter as transmitting a signal (e.g. RA preamble) during BFR procedure. In this example, UE could ignore the SRI value indicated in the first occasion to transmit PUSCH on the third occasion. In the same example, after the UE receives a response successfully, if the UE receives a second (re)configuration for PUSCH with configured grant before the third occasion, the UE could transmit PUSCH on the third occasion via using the transmission precoder/spatial filter determined based on a SRI value indicated by the second configuration.

In one embodiment, the configuration for PUSCH with configured grant could refer to ConfiguredGrantConfig. Furthermore, the first configuration could refer to ConfiguredGrantConfig. In addition, the second configuration could refer to ConfiguredGrantConfig. The first configuration may comprise a SRI field. The second configuration may comprise a SRI field.

In one embodiment, the first PUSCH with configured grant could refer to type 1 PUSCH with configured grant. The second PUSCH with configured grant could refer to type 1 PUSCH with configured grant.

Embodiment 4 (Type 2 UL Transmission with Configured Grant after BFR)

A UE could transmit a third PUSCH with configured grant via assuming the third PUSCH with configured grant is spatially quasi co-located with a third reference signal. In one embodiment, the UE could receive a third DCI indicates activation command of PUSCH with configured grant.

In one embodiment, the third reference signal could be related to a SRI value indicated in the third DCI, a SRI value indicated by a third configuration of PUSCH with configured grant, or a SRI value among configuration of spatial setting for transmitting PUCCH, e.g. PUCCH-Spatialrelationinfo. The third reference signal could also be related to a SRI value activated for transmitting a PUCCH resource, wherein the SRI value is activated from configuration for spatial setting of PUCCH, e.g. PUCCH-Spatialrelationinfo. The PUCCH resource could be with a lowest or highest PUCCH index (configured in a serving cell).

In one embodiment, the third PUSCH could be transmitted in the time domain resource and/or frequency domain resource indicated by the third DCI or the third configuration.

The UE could transmit a random access preamble for beam failure recovery or link reconfiguration. In one embodiment, the UE could receive from higher layers, by parameter Beam-failure-recovery-request-RACH-Resource, a configuration for a PRACH transmission. The random access preamble could be transmitted on a PRACH resource associated with a reference signal with index $q_{new}$. The index $q_{new}$ could be among the periodic CSI-RS configuration indexes and/or SS/PBCH block indexes from the set $\bar{q}_1$ and the corresponding L1-RSRP measurements that are larger than or equal to $Q_{in,LR}$. In one embodiment, the index $q_{new}$ could be selected among the periodic CSI-RS configuration indexes and/or SS/PBCH block indexes from the set $\bar{q}_1$ and the corresponding L1-RSRP measurements that are larger than or equal to $Q_{in,LR}$. The index $q_{new}$ could also be selected by higher layer.

A UE could be configured with one control resource set by higher layer parameter Beam-failure-Recovery-Response-CORESET and with an associated search space provided by higher layer parameter search-space-config. For the random access preamble transmission in slot n and according to antenna port quasi co-location parameters associated with the reference signal, the UE could monitor PDCCH for detection of a DCI format with CRC scrambled by C-RNTI starting from slot n+4 within a window configured by higher layer parameter Beam-failure-recovery-request-window.

In one embodiment, if or after the UE receives the DCI format with CRC scrambled by C-RNTI, the UE could transmit:

- a fourth PUSCH with configured grant via assuming the antenna port quasi co-located information derived from the random access preamble or the PRACH resource until the UE receives a fourth DCI or receives a fourth configuration of PUSCH with configured grant;
- a fourth PUSCH with configured grant via using the same spatial filter for transmitting the random access preamble or the PRACH resource until the UE receives a fourth DCI or receives a fourth configuration of PUSCH with configured grant;
- a fourth PUSCH with configured grant with the same transmission precoder for transmitting the random access preamble or the PRACH resource until the UE receives a fourth configuration;
- a fourth PUSCH with configured grant according to at least one field indicated in the third DCI until the UE receives a fourth DCI, e.g. MCS, RV, time domain assignment, frequency domain assignment, or HARQ process; and/or
- a fourth PUSCH with configured grant according to at least one field indicated in the third DCI until the UE receives a fourth DCI, e.g. MCS, RV, time domain assignment, frequency domain assignment, HARQ process, except for TCI state field.

In one embodiment, if or after the UE receives the DCI format with CRC scrambled by C-RNTI, the UE could assume that at least transmission precoder of a fourth PUSCH with configured grant is determined based on the random access preamble or the PRACH resource until the UE receives a fourth configuration.

In one embodiment, if or after the UE receives the DCI format with CRC scrambled by C-RNTI, the UE could ignore, discard, or release the content(s) indicated by the third DCI. The UE could also ignore, discard, or release the SRI value indicated by the third DCI.

In one embodiment, if or after the UE declares or detects beam failure occurs or if BFI_COUNTER=beamFailureInstanceMaxCount+1, the UE could ignore, discard, or release the content(s) indicated in the third DCI. The UE could also ignore, discard, or release the SRI indicated in the third DCI.

In one embodiment, if or after the UE transmits the random access preamble, the UE could ignore, discard, or release the content(s) indicated in the third DCI. The UE could also ignore, discard, or release the SRI indicated in the third DCI.

In one embodiment, the UE may not transmit PUSCH with configured grant on occasion(s) which occurs after the UE receives the DCI format with CRC scrambled by C-RNTI until the UE receives the fourth DCI. Furthermore, the UE may not be expected to transmit PUSCH with configured grant on occasion(s) which occurs after the UE receives the DCI format with CRC scrambled by C-RNTI until the UE receives the fourth DCI.

In one embodiment, if or after the UE receives the fourth DCI, the UE could transmit the fourth PUSCH with configured grant via using the antenna port quasi co-located information derived from a SRI value indicated in the fourth DCI.

In one embodiment, if or after the UE receives the fourth configuration of PUSCH with configured grant, the UE could transmit:
the fourth PUSCH with configured grant via using the antenna port quasi co-located information derived from a SRI value indicated by the fourth configuration; or
the fourth PUSCH with configured grant via using the transmission precoder determined based on a SRI value indicated by the fourth configuration;

In one embodiment, the fourth DCI could indicate activation command of PUSCH with configured grant. The fourth DCI and/or the fourth configuration could be transmitted after the DCI format with CRC scrambled by C-RNTI.

In one embodiment, if or after the UE receives the fourth DCI, the UE could transmit the fourth PUSCH in the time domain resource and/or frequency domain resource indicated by the fourth DCI. If or after the UE receives the fourth configuration, the UE could transmit the fourth PUSCH in the time domain resource and/or frequency domain resource indicated by the fourth configuration.

Figure 8:
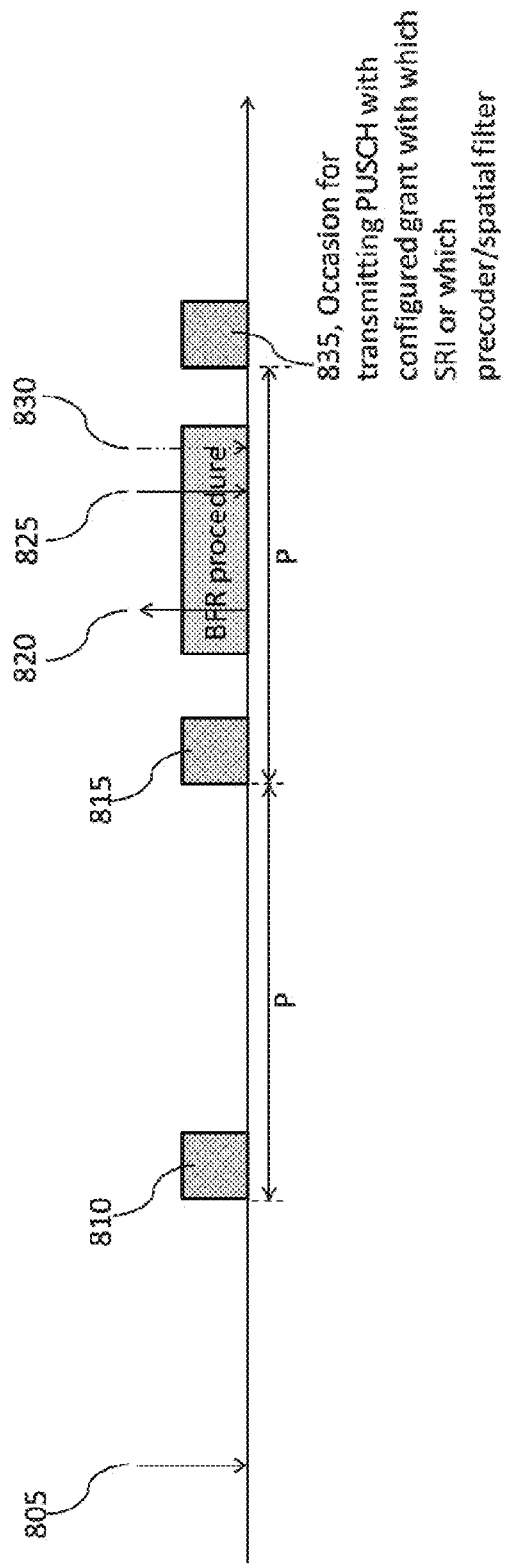
FIG. 8 is a diagram according to one embodiment.

Embodiment 4 can be used to solve, at least but not limited to, an issue illustrated in FIG. 8. In step 805, UE may receive a first DCI scrambled with CS-RNTI indicating activation of PUSCH with configured grant, wherein the first DCI indicates a SRI value, e.g. "0000". In step 810, UE may transmit PUSCH with configured grant via transmission precoder or spatial filter derived from the indicated SRI value on a first occasion. In step 815, UE may transmit PUSCH with configured grant via transmission precoder or spatial filter derived from the indicated SRI value on a second occasion. In step 820, UE may transmit a signal on a resource associated with a reference signal, in response to detecting beam failure. In step 825, UE may receive a response via quasi-co-location information derived from the reference signal. In step 830, UE may receive a second DCI scrambled with CS-RNTI indicating activation of PUSCH with configured grant before a third occasion. In step 835, UE may determine transmission precoder or spatial filter for transmitting PUSCH with configured grant on the third occasion.

For one example to determine transmission precoder or spatial filter for transmitting PUSCH with configured grant, if the UE triggers BFR procedure during a second occasion and a third occasion for transmitting PUSCH with configured grant, the UE could transmit PUSCH with configured grant on the third occasion via using same transmission precoder/same spatial filter as transmitting a signal during BFR procedure. In the same example, after the UE receives a response successfully, if the UE receives another DCI scrambled with CS-RNTI indicating activation command of PUSCH with configured grant before the third occasion, the UE could transmit PUSCH on the third occasion via using the transmission precoder determined based on a SRI value indicated by the another DCI.

In one embodiment, the UE could be configured to transmit PUSCH with configured grant on configured occasion(s) periodically. The UE could receive a signal indicating configuration of PUSCH with configured grant. The configuration for PUSCH with configured grant could refer to ConfiguredGrantConfig. The third DCI may comprise a SRI field. The fourth DCI may comprise a SRI field.

In one embodiment, the third PUSCH with configured grant could refer to type 2 PUSCH with configured grant. The fourth PUSCH with configured grant could refer to type 2 PUSCH with configured grant.

Figure 9:
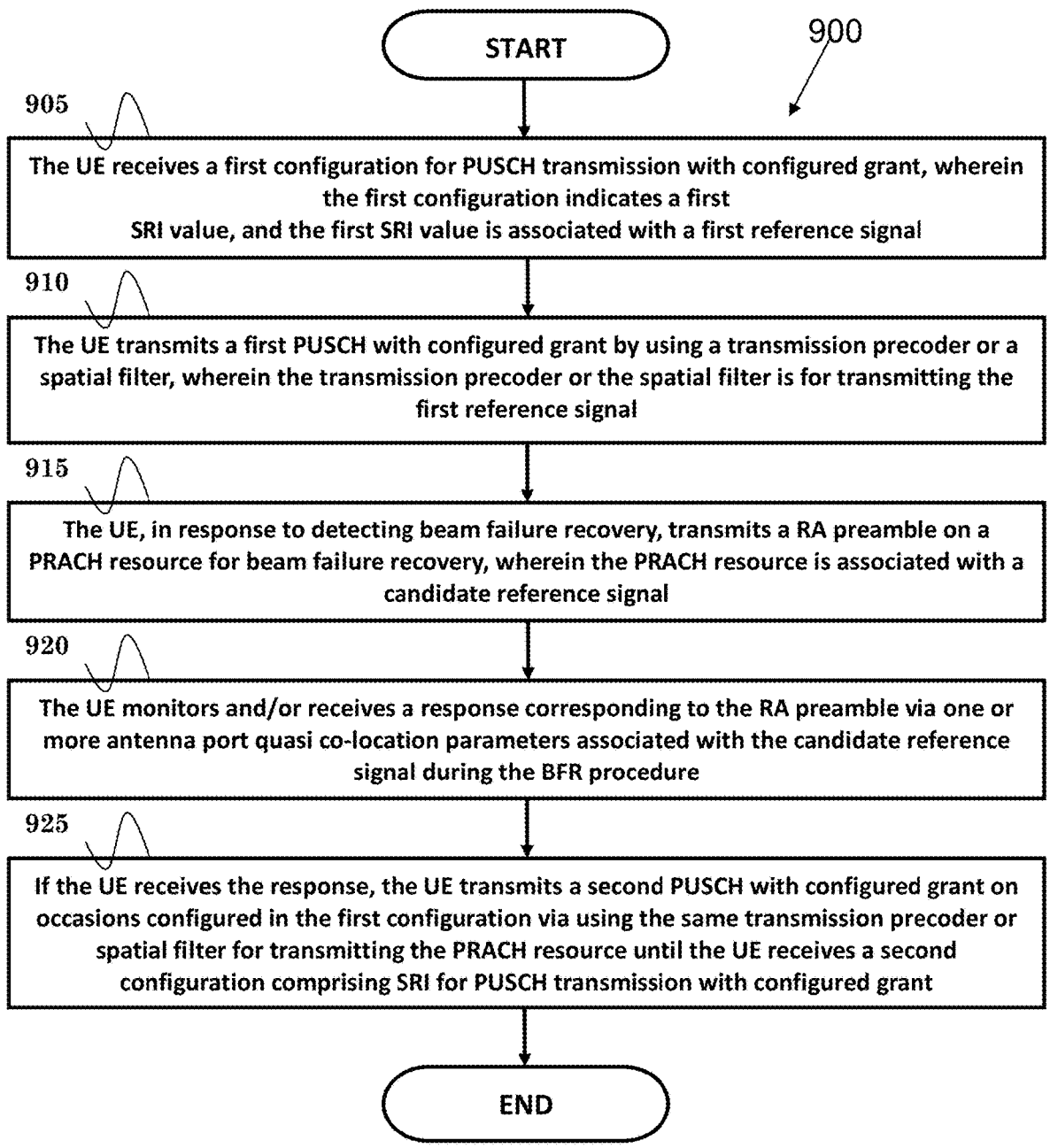
FIG. 9 is a flow chart according to one embodiment.

FIG. 9 is a flow chart 900 according to one exemplary embodiment from the perspective of a UE (User Equipment). In step 905, the UE receives a first configuration for PUSCH transmission with configured grant, wherein the first configuration indicates a first SRI value, and the first SRI value is associated with a first reference signal. In step 910, the UE transmits a first PUSCH with configured grant by using a transmission precoder or a spatial filter, wherein the transmission precoder or the spatial filter is for transmitting the first reference signal. In step 915, the UE, in response to detecting beam failure recovery, transmits a RA preamble on a PRACH resource for beam failure recovery, wherein the PRACH resource is associated with a candidate reference signal. In step 920, the UE monitors and/or receives a response corresponding to the RA preamble via one or more antenna port quasi co-location parameters associated with the candidate reference signal during the BFR procedure. In step 925, if the UE receives the response, the UE transmits a second PUSCH with configured grant on occasions configured in the first configuration via using the same transmission precoder or spatial filter for transmitting the PRACH resource until the UE receives a second configuration comprising SRI for PUSCH transmission with configured grant.

In one embodiment, after the UE receives the second configuration, the UE could transmit PUSCH with configured grant based on the second configuration.

In one embodiment, the first configuration could indicate at least one of a plurality of periodical occasions for the UE to transmit PUSCH with configured grant. The second configuration could indicate a configuration for PUSCH transmission with configured grant or a second SRI value.

Referring back to FIGS. 3 and 4, in one exemplary embodiment of a UE, the device 300 includes a program code 312 stored in the memory 310. The CPU 308 could execute program code 312 to enable the UE (i) to receive a first configuration for PUSCH transmission with configured grant, wherein the first configuration indicates a first SRI value, and the first SRI value is associated with a first reference signal, (ii) to transmit a first PUSCH with configured grant by using a transmission precoder or a spatial filter, wherein the transmission precoder or the spatial filter is for transmitting the first reference signal, (iii) to transmit, in response to detecting beam failure recovery, a RA preamble on a PRACH resource for beam failure recovery, wherein the PRACH resource is associated with a candidate reference signal, (iv) to monitor and/or receive a response corresponding to the RA preamble via one or more antenna port quasi co-location parameters associated with the candidate reference signal during the BFR procedure, and (v) to transmit, if the UE receives the response, a second PUSCH with configured grant on occasions configured in the first configuration via using the same transmission precoder or spatial filter for transmitting the PRACH resource until the UE receives a second configuration comprising SRI for PUSCH transmission with configured grant. Furthermore, the CPU 308 can execute the program code 312 to perform all of the above-described actions and steps or others described herein.

Figure 10:
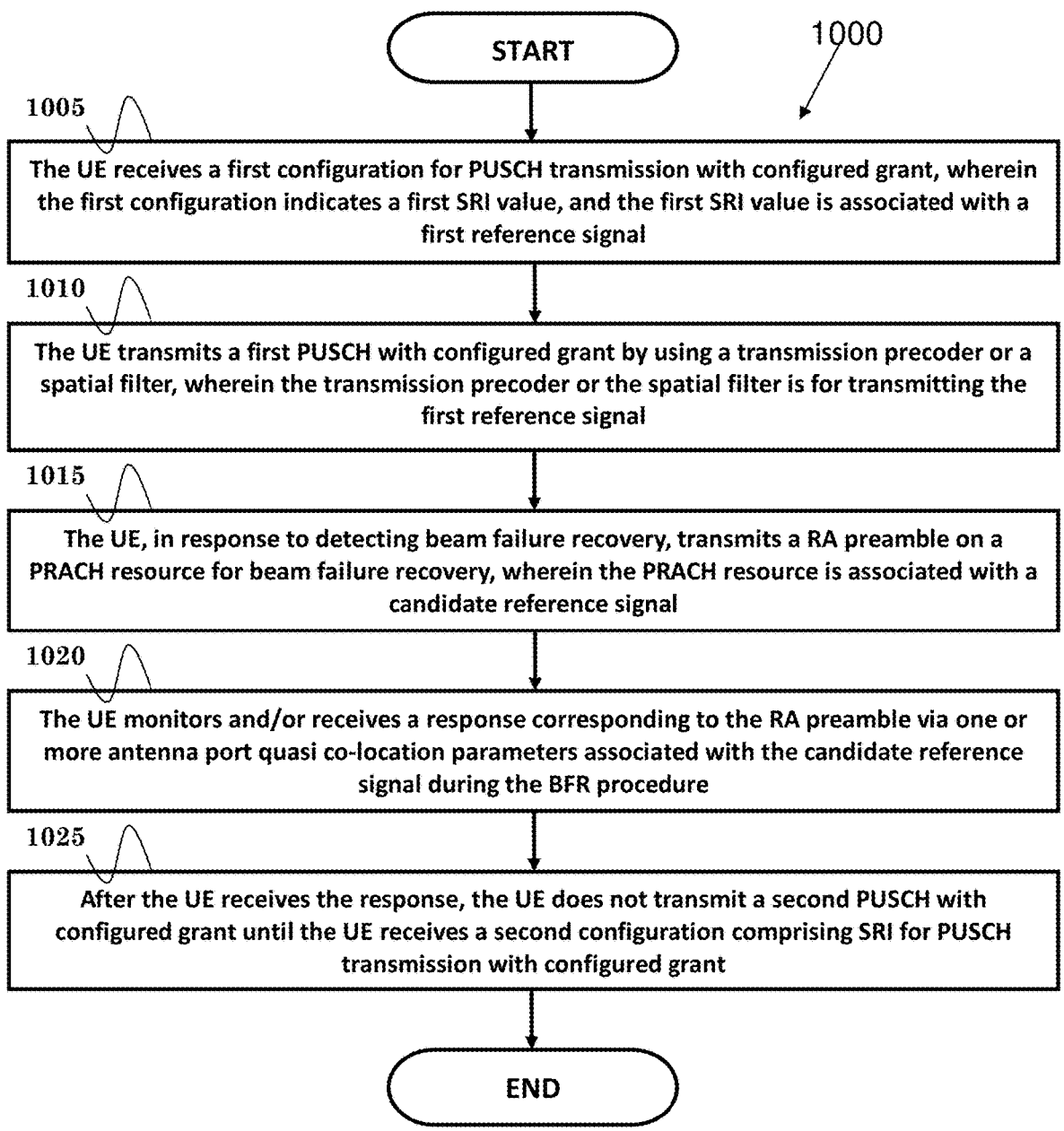
FIG. 10 is a flow chart according to one embodiment.

FIG. 10 is a flow chart 1000 according to one exemplary embodiment from the perspective of a UE. In step 1005, the UE receives a first configuration for PUSCH transmission with configured grant, wherein the first configuration indicates a first SRI value, and the first SRI value is associated with a first reference signal. In step 1010, the UE transmits a first PUSCH with configured grant by using a transmission precoder or a spatial filter, wherein the transmission precoder or the spatial filter is for transmitting the first reference signal. In step 1015, the UE, in response to detecting beam failure recovery, transmits a RA preamble on a PRACH resource for beam failure recovery, wherein the PRACH resource is associated with a candidate reference signal. In step 1020, the UE monitors and/or receives a response corresponding to the RA preamble via one or more antenna port quasi co-location parameters associated with the candidate reference signal during the BFR procedure. In step 1025, after the UE receives the response, the UE does not transmit a second PUSCH with configured grant until the UE receive a second configuration comprising SRI for PUSCH transmission with configured grant.

In one embodiment, after the UE receives the second configuration, the UE could transmit PUSCH with configured grant based on the second configuration. The first configuration could indicate at least one of a plurality of periodical occasions for the UE to transmit PUSCH with configured grant. The second configuration could indicate a configuration for PUSCH transmission with configured grant. The second configuration could also indicate a second SRI value.

Referring back to FIGS. 3 and 4, in one exemplary embodiment of a UE, the device 300 includes a program code 312 stored in the memory 310. The CPU 308 could execute program code 312 to enable the UE (i) to receive a first configuration for PUSCH transmission with configured grant, wherein the first configuration indicates a first SRI value, and the first SRI value is associated with a first reference signal, (ii) to transmit a first PUSCH with configured grant by using a transmission precoder or a spatial filter, wherein the transmission precoder or the spatial filter is for transmitting the first reference signal, (iii) to transmit, in response to detecting beam failure recovery, a RA preamble on a PRACH resource for beam failure recovery, wherein the PRACH resource is associated with a candidate reference signal, (iv) to monitor and/or receive a response corresponding to the RA preamble via one or more antenna port quasi co-location parameters associated with the candidate reference signal during the BFR procedure, and (v), to not transmit, after the UE receives the response, a second PUSCH with configured grant until the UE receive a second configuration comprising SRI for PUSCH transmission with configured grant. Furthermore, the CPU 308 can execute the program code 312 to perform all of the above-described actions and steps or others described herein.

Figure 11:
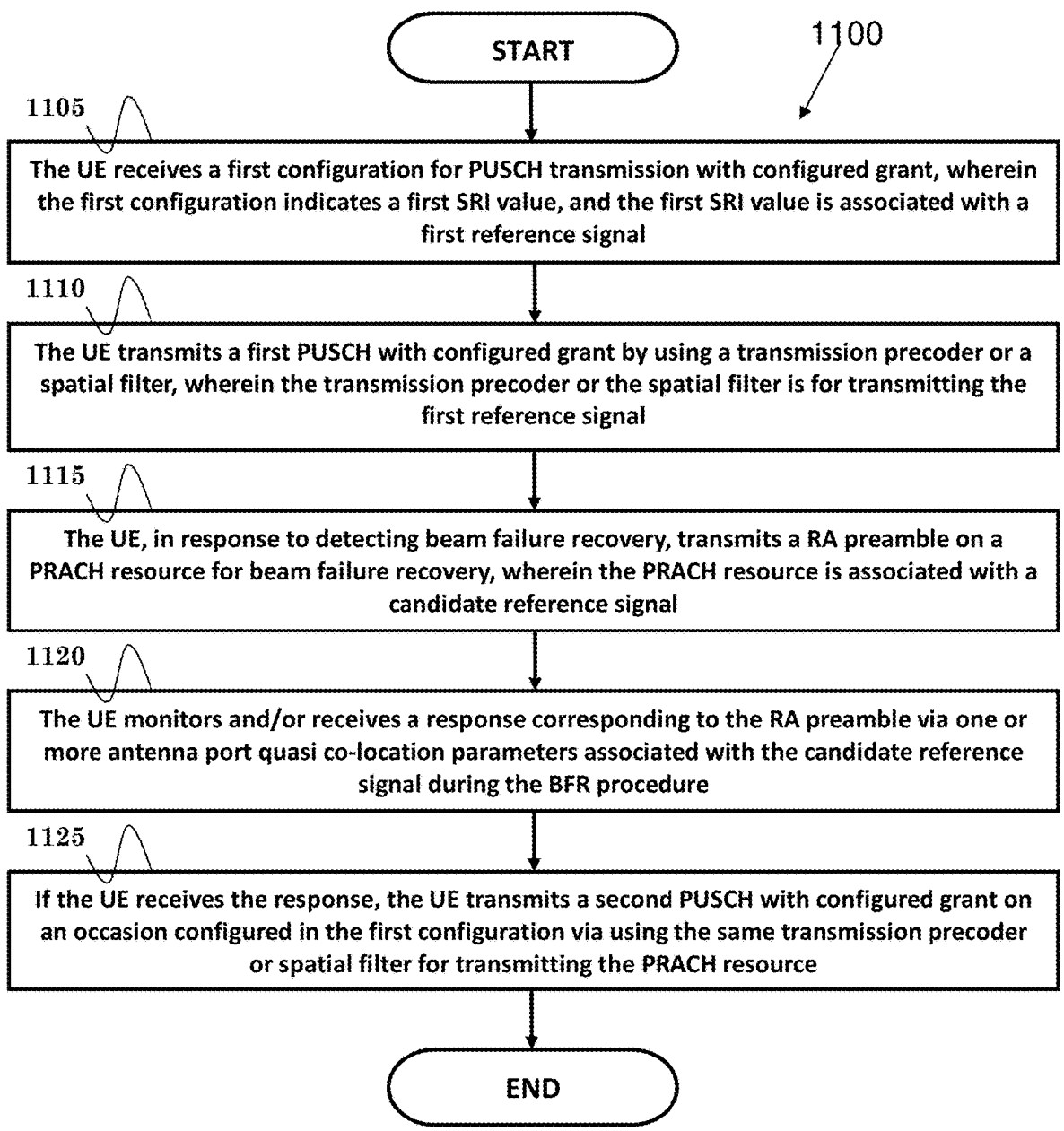
FIG. 11 is a flow chart according to one exemplary embodiment.

FIG. 11 is a flow chart 1100 according to one exemplary embodiment from the perspective of a UE. In step 1105, the UE receives a first configuration for PUSCH transmission with configured grant, wherein the first configuration indicates a first SRI value, and the first SRI value is associated with a first reference signal. In step 1110, the UE transmits a first PUSCH with configured grant by using a transmission precoder or a spatial filter, wherein the transmission precoder or the spatial filter is for transmitting the first reference signal. In step 1115, the UE, in response to detecting beam failure recovery, transmits a RA preamble on a PRACH resource for beam failure recovery, wherein the PRACH resource is associated with a candidate reference signal. In step 1020, the UE monitors and/or receives a response corresponding to the RA preamble via one or more antenna port quasi co-location parameters associated with the candidate reference signal during the BFR procedure. In step 1125, if the UE receives the response, the UE transmits a second PUSCH with configured grant on an occasion configured in the first configuration via using the same transmission precoder or spatial filter for transmitting the PRACH resource.

In one embodiment, if the UE receives the response, the UE could transmit a second PUSCH with configured grant on an occasion configured in the first configuration via using the same transmission precoder or spatial filter for transmitting the PRACH resource until the UE receives a second configuration for PUSCH transmission with configured grant. The UE may not receive a second configuration comprising SRI for PUSCH transmission with configured grant before the occasion, wherein the occasion is located after the response.

In one embodiment, an occasion configured in configuration for PUSCH with configured grant could be a timing at which the UE transmits PUSCH with configured grant on time and/or frequency resources configured in configuration for PUSCH with configured grant. After the UE receives the second configuration, the UE could transmit PUSCH with configured grant based on the second configuration.

In one embodiment, the first configuration could indicate at least one of a plurality of periodical occasions for the UE to transmit PUSCH with configured grant. The second configuration could indicate configuration for PUSCH transmission with configured grant. The second configuration could also indicate a second SRI value.

Referring back to FIGS. 3 and 4, in one exemplary embodiment of a UE, the device 300 includes a program code 312 stored in the memory 310. The CPU 308 could execute program code 312 to enable the UE (i) to receive a first configuration for PUSCH transmission with configured grant, wherein the first configuration indicates a first SRI value, and the first SRI value is associated with a first reference signal, (ii) to transmit a first PUSCH with configured grant by using a transmission precoder or a spatial filter, wherein the transmission precoder or the spatial filter is for transmitting the first reference signal, (iii) to transmit, in response to detecting beam failure recovery, a RA preamble on a PRACH resource for beam failure recovery, wherein the PRACH resource is associated with a candidate reference signal, (iv) to monitor and/or receive a response corresponding to the RA preamble via the antenna port quasi co-location parameters associated with the candidate reference signal during the BFR procedure, and (v) to transmit, if the UE receives the response, a second PUSCH with configured grant on an occasion configured in the first configuration via using the same transmission precoder or spatial filter for transmitting the PRACH resource. Furthermore, the CPU 308 can execute the program code 312 to perform all of the above-described actions and steps or others described herein.

Figure 12:
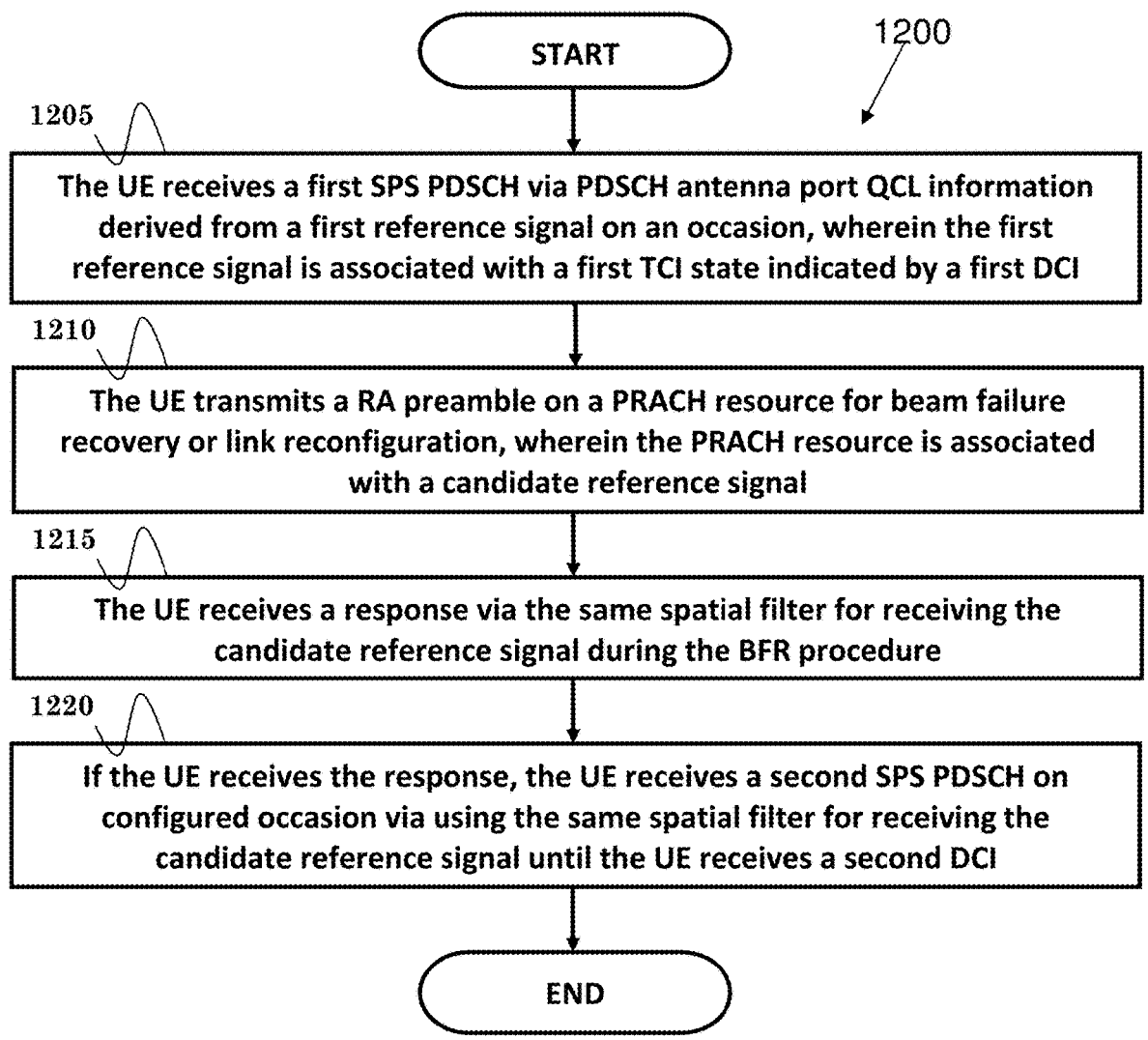
FIG. 12 is a flow chart according to one exemplary embodiment.

FIG. 12 is a flow chart 1200 according to one exemplary embodiment from the perspective of a UE. In step 1205, the UE receives a first SPS PDSCH via PDSCH antenna port QCL information derived from a first reference signal on an occasion, wherein the first reference signal is associated with a first TCI state indicated by a first DCI. In step 1210, the UE transmits a RA preamble on a PRACH resource for beam failure recovery or link reconfiguration, wherein the PRACH resource is associated with a candidate reference signal. In step 1215, the UE receives a response via the same spatial filter for receiving the candidate reference signal during the BFR procedure. In step 1220, if the UE receives the response, the UE receives a second SPS PDSCH on configured occasion via using the same spatial filter for receiving the candidate reference signal until the UE receives a second DCI.

In one embodiment, if the UE receives the response, the UE could receive a second SPS PDSCH via using the same spatial filter for receiving the candidate reference signal until the UE receives a second DCI indicating activation command of SPS PDSCH. Alternatively, if the UE receives the response, the UE could receive the second SPS PDSCH in time domain resource and/or frequency domain resource indicated in the first DCI until the UE receives the second DCI. The response could be a DCI format with CRC scrambled by C-RNTI received in a CORESET for beam failure recovery or link reconfiguration.

In one embodiment, the UE could be configured a period for receiving DL SPS PDSCH or the first SPS PDSCH. The period could indicate interval between the neighboring occasions for receiving SPS PDSCH. The first DCI could indicate activation command of SPS PDSCH. The first DCI may comprise a field indicating the first TCI state. The second DCI may comprise a field indicating a second TCI state.

In one embodiment, the UE does not receive the second SPS PDSCH via the first reference signal. The candidate reference signal could be different from the first reference signal.

In one embodiment, the second DCI could indicate a second TCI state associated with a second reference signal. The second TCI could be associated with the first reference signal. The second TCI could be different from the first TCI. The second reference signal could be different from the first reference signal.

In one embodiment, if the UE receives the second DCI indicating activation command of SPS PDSCH, the UE could receive the SPS PDSCH via the same spatial filter for receiving the second reference signal.

Referring back to FIGS. 3 and 4, in one exemplary embodiment of a UE, the device 300 includes a program code 312 stored in the memory 310. The CPU 308 could execute program code 312 to enable the UE (i) to receive a first SPS PDSCH via PDSCH antenna port QCL information derived from a first reference signal on an occasion, wherein the first reference signal is associated with a first TCI state indicated by a first DCI, (ii) to transmit a RA preamble on a PRACH resource for beam failure recovery or link reconfiguration, wherein the PRACH resource is associated with a candidate reference signal, (iii) to receive a response via the same spatial filter for receiving the candidate reference signal during the BFR procedure, and (iv) to receive, if the UE receives the response, a second SPS PDSCH on configured occasion via using the same spatial filter for receiving the candidate reference signal until the UE receives a second DCI. Furthermore, the CPU 308 can execute the program code 312 to perform all of the above-described actions and steps or others described herein.

Figure 13:
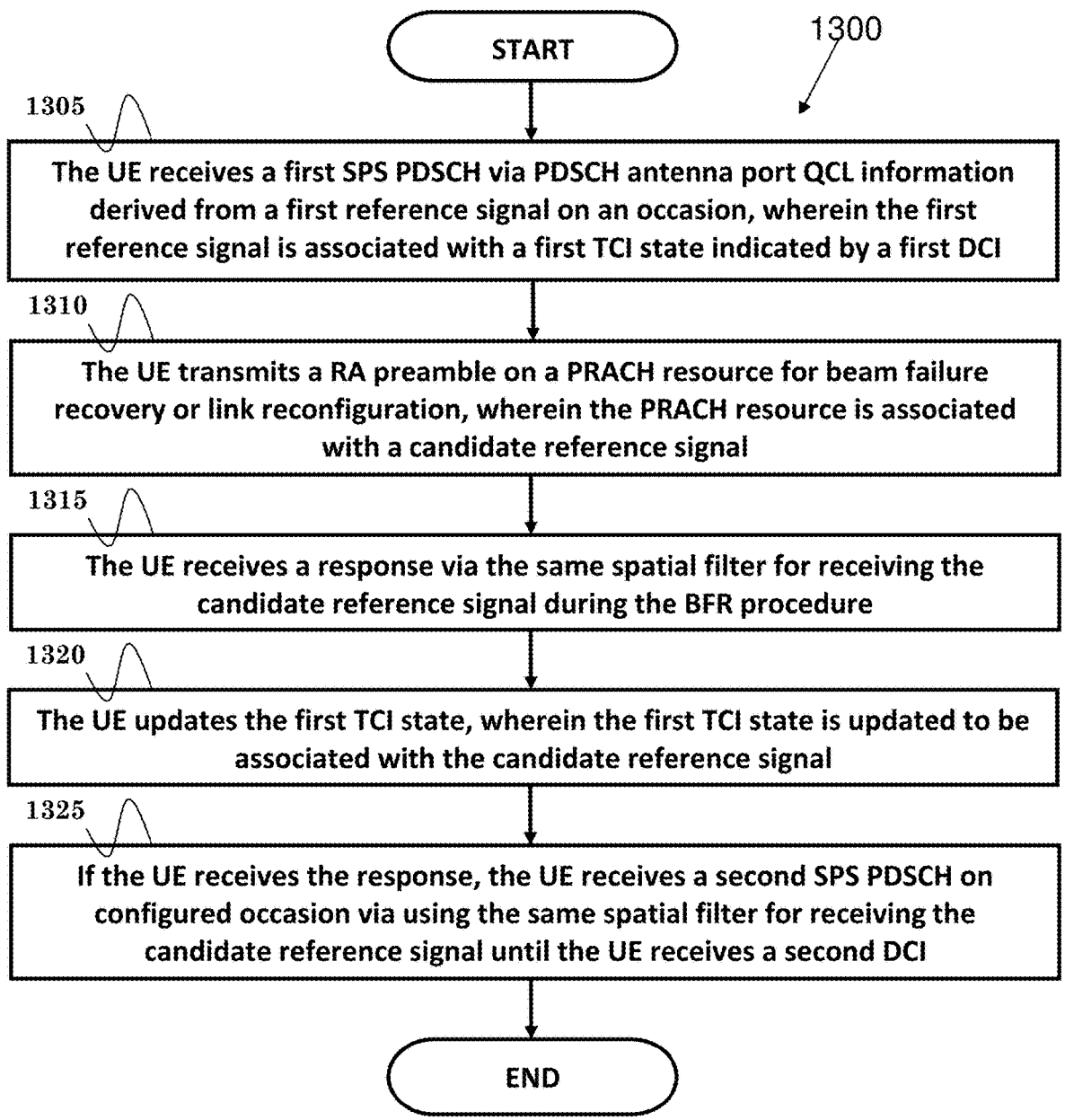
FIG. 13 is a flow chart according to one exemplary embodiment.

FIG. 13 is a flow chart 1300 according to one exemplary embodiment from the perspective of a UE. In step 1305, the UE receives a first SPS PDSCH via PDSCH antenna port QCL information derived from a first reference signal on an occasion, wherein the first reference signal is associated with a first TCI state indicated by a first DCI. In step 1310, the UE transmits a RA preamble on a PRACH resource for beam failure recovery or link reconfiguration, wherein the PRACH resource is associated with a candidate reference signal. In step 1315, the UE receives a response via the same spatial filter for receiving the candidate reference signal during the BFR procedure. In step 1320, the UE updates the first TCI state, wherein the first TCI state is updated to be associated with the candidate reference signal. In step 1325, if the UE receives the response, the UE receives a second SPS PDSCH on configured occasion via using the same spatial filter for receiving the candidate reference signal until the UE receives a second DCI.

In one embodiment, the response could be a DCI format with CRC scrambled by C-RNTI received in a CORESET for beam failure recovery or link reconfiguration.

Referring back to FIGS. 3 and 4, in one exemplary embodiment of a UE, the device 300 includes a program code 312 stored in the memory 310. The CPU 308 could execute program code 312 to enable the UE (i) to receive a first SPS PDSCH via PDSCH antenna port QCL information derived from a first reference signal on an occasion, wherein the first reference signal is associated with a first TCI state indicated by a first DCI, (ii) to transmit a RA preamble on a PRACH resource for beam failure recovery or link reconfiguration, wherein the PRACH resource is associated with a candidate reference signal, (iii) to receive a response via the same spatial filter for receiving the candidate reference signal during the BFR procedure, (iv) to update the first TCI state, wherein the first TCI state is updated to be associated with the candidate reference signal, and (v) to receive, if the UE receives the response, a second SPS PDSCH on configured occasion via using the same spatial filter for receiving the candidate reference signal until the UE receives a second DCI. Furthermore, the CPU 308 can execute the program code 312 to perform all of the above-described actions and steps or others described herein.

Figure 14:
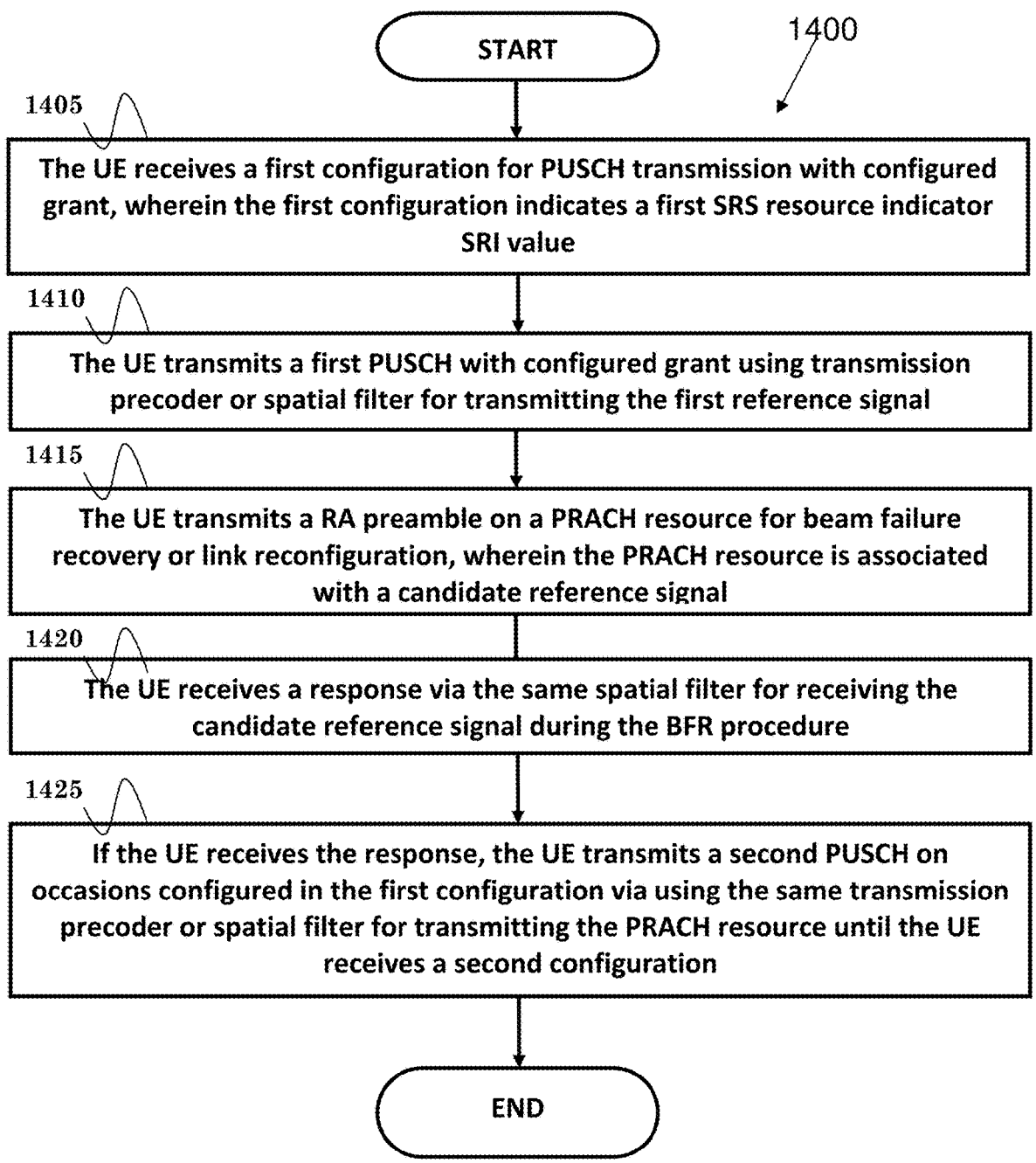
FIG. 14 is a flow chart according to one exemplary embodiment.

FIG. 14 is a flow chart 1400 according to one exemplary embodiment from the perspective of a UE. In step 1405, the UE receives a first configuration for PUSCH transmission with configured grant, wherein the first configuration indicates a first SRS resource indicator (SRI) value. In step 1410, the UE transmits a first PUSCH with configured grant using transmission precoder or spatial filter for transmitting the first reference signal. In step 1415, the UE transmits a RA preamble on a PRACH resource for beam failure recovery or link reconfiguration, wherein the PRACH resource is associated with a candidate reference signal. In step 1420, the UE receives a response via the same spatial filter for receiving the candidate reference signal during the BFR procedure. In step 1425, if the UE receives the response, the UE transmits a second PUSCH on occasions configured in the first configuration via using the same transmission precoder or spatial filter for transmitting the PRACH resource until the UE receives a second configuration.

In one embodiment, the response could be a DCI format with CRC scrambled by C-RNTI received in a CORESET for beam failure recovery or link reconfiguration. The first configuration could indicate periodical occasion(s) for UE to transmit PUSCH with configured grant. The second configuration could indicate configuration for PUSCH transmission with configured grant. The second configuration could also indicate a second SRI value.

In one embodiment, after the UE receives the second configuration, the UE could transmit PUSCH with configured grant based on the second configuration.

Referring back to FIGS. 3 and 4, in one exemplary embodiment of a UE, the device 300 includes a program code 312 stored in the memory 310. The CPU 308 could execute program code 312 to enable the UE (i) to receive a first configuration for PUSCH transmission with configured grant, wherein the first configuration indicates a first SRI value, (ii) to transmit a first PUSCH with configured grant using transmission precoder or spatial filter for transmitting the first reference signal, (iii) to transmit a RA preamble on a PRACH resource for beam failure recovery or link reconfiguration, wherein the PRACH resource is associated with a candidate reference signal, (iv) to receive a response via the same spatial filter for receiving the candidate reference signal during the BFR procedure, and (v) to transmit, if the UE receives the response, a second PUSCH on occasions configured in the first configuration via using the same transmission precoder or spatial filter for transmitting the PRACH resource until the UE receives a second configuration. Furthermore, the CPU 308 can execute the program code 312 to perform all of the above-described actions and steps or others described herein.

Figure 15:
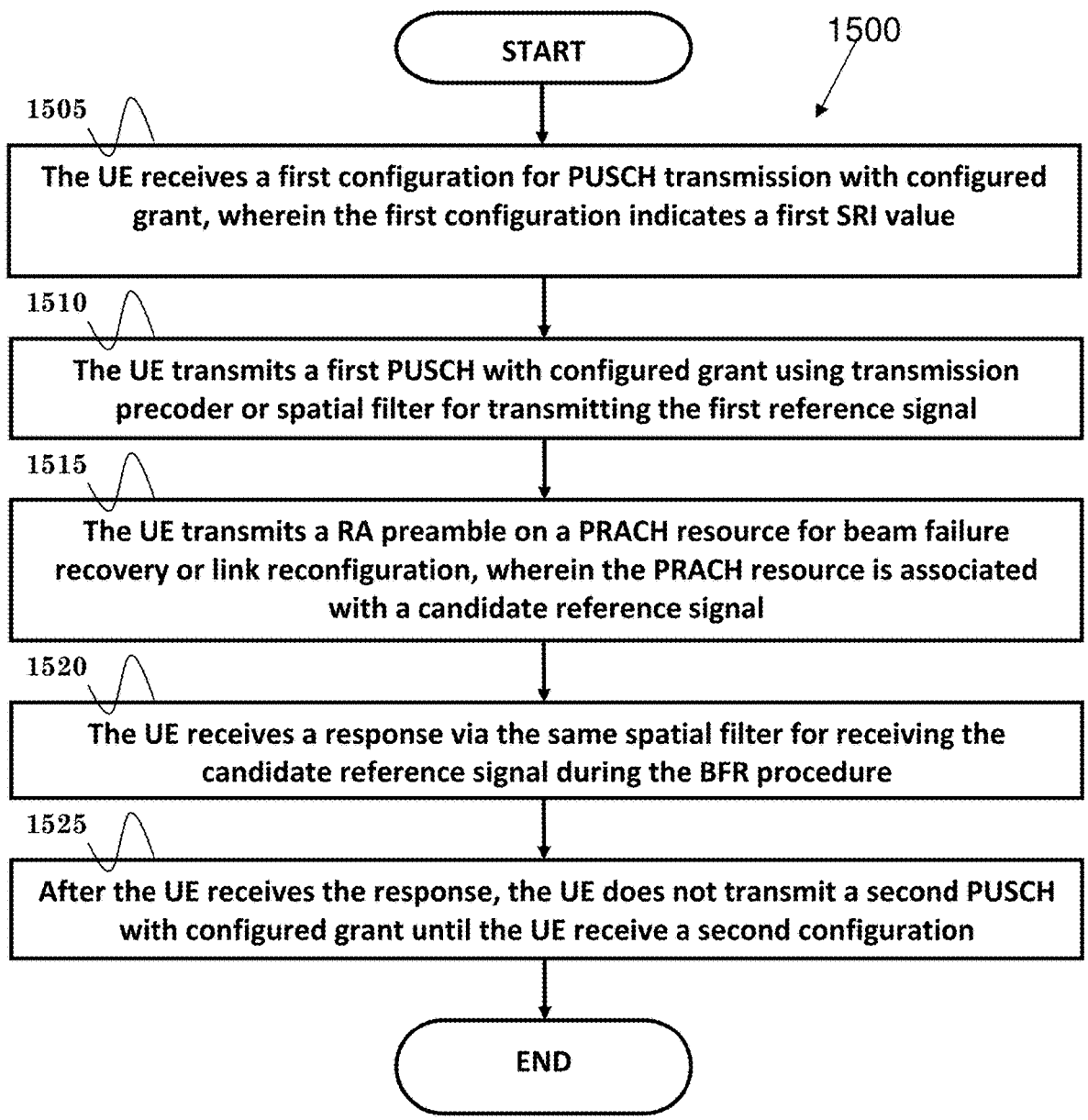
FIG. 15 is a flow chart according to one exemplary embodiment.

FIG. 15 is a flow chart 1500 according to one exemplary embodiment from the perspective of a UE. In step 1505, the UE receives a first configuration for PUSCH transmission with configured grant, wherein the first configuration indicates a first SRI value. In step 1510, the UE transmits a first PUSCH with configured grant using transmission precoder or spatial filter for transmitting the first reference signal. In step 1515, the UE transmits a RA preamble on a PRACH resource for beam failure recovery or link reconfiguration, wherein the PRACH resource is associated with a candidate reference signal. In step 1520, the UE receives a response via the same spatial filter for receiving the candidate reference signal during the BFR procedure. In step 1525, after the UE receives the response, the UE does not transmit a second PUSCH with configured grant until the UE receive a second configuration.

In one embodiment, the response could be a DCI format with CRC scrambled by C-RNTI received in a CORESET for beam failure recovery or link reconfiguration. The first configuration could indicate periodical occasion(s) for UE to transmit PUSCH with configured grant. The second configuration could indicate configuration for PUSCH transmission with configured grant. The second configuration could also indicate a second SRI value.

In one embodiment, after the UE receives the second configuration, the UE could transmit PUSCH with configured grant based on the second configuration. The second configuration could be received after the response.

Referring back to FIGS. 3 and 4, in one exemplary embodiment of a UE, the device 300 includes a program code 312 stored in the memory 310. The CPU 308 could execute program code 312 to enable the UE (i) to receive a first configuration for PUSCH transmission with configured grant, wherein the first configuration indicates a first SRI value, (ii) to transmit a first PUSCH with configured grant using transmission precoder or spatial filter for transmitting the first reference signal, (iii) to transmit a RA preamble on a PRACH resource for beam failure recovery or link reconfiguration, wherein the PRACH resource is associated with a candidate reference signal, (iv) to receive a response via the same spatial filter for receiving the candidate reference signal during the BFR procedure, and (v) to not transmit, after the UE receives the response, a second PUSCH with configured grant until the UE receive a second configuration. Furthermore, the CPU 308 can execute the program code 312 to perform all of the above-described actions and steps or others described herein.

Figure 16:
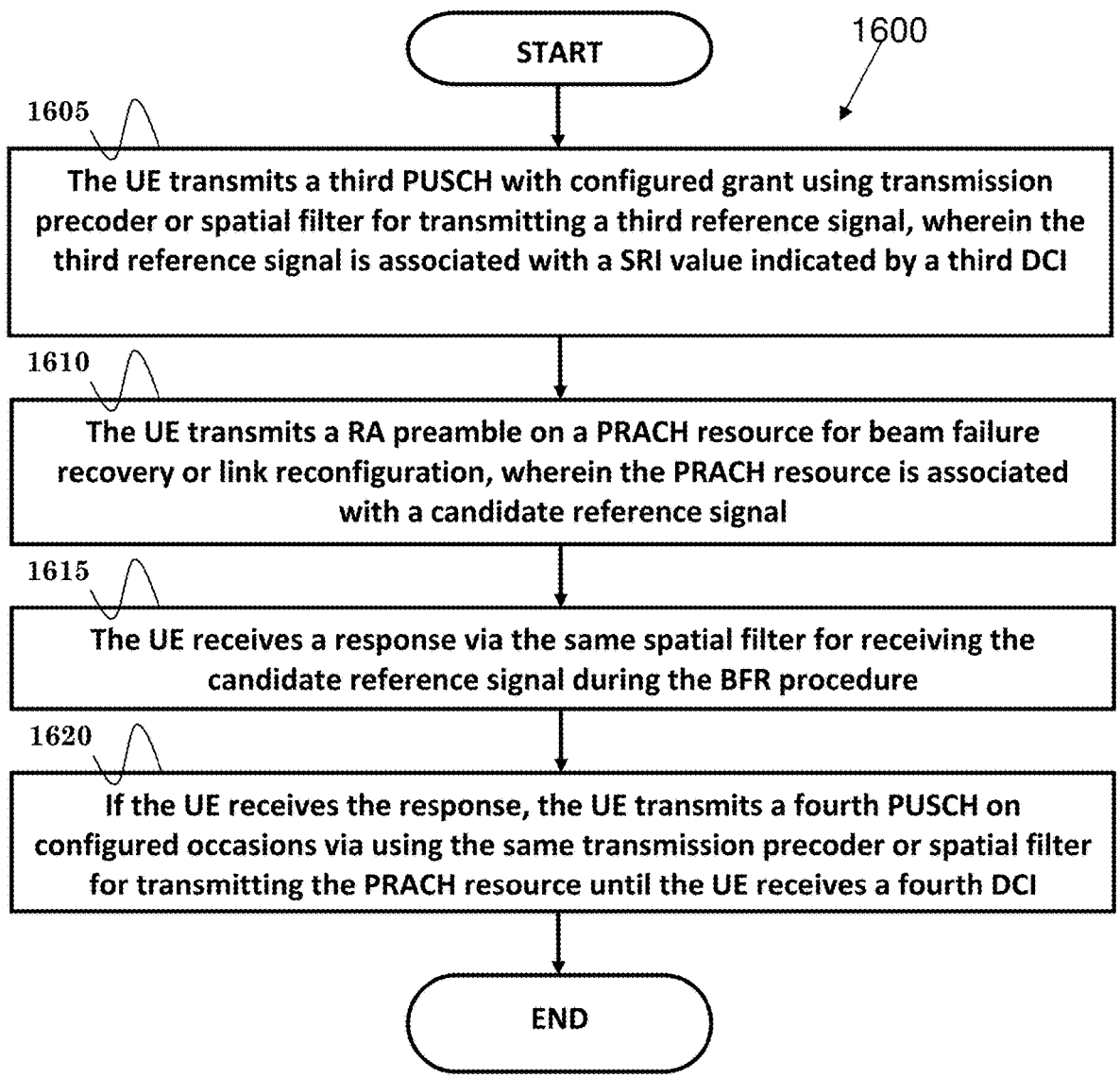
FIG. 16 is a flow chart according to one exemplary embodiment.

FIG. 16 is a flow chart 1600 according to one exemplary embodiment from the perspective of a UE. In step 1605, the UE transmits a third PUSCH with configured grant using transmission precoder or spatial filter for transmitting a third reference signal, wherein the third reference signal is associated with a SRI value indicated by a third DCI. In step 1610, the UE transmits a RA preamble on a PRACH resource for beam failure recovery or link reconfiguration, wherein the PRACH resource is associated with a candidate reference signal. In step 1615, the UE receives a response via the same spatial filter for receiving the candidate reference signal during the BFR procedure. In step 1620, if the UE receives the response, the UE transmits a fourth PUSCH on configured occasions via using the same transmission precoder or spatial filter for transmitting the PRACH resource until the UE receives a fourth DCI.

In one embodiment, the response could be a DCI format with CRC scrambled by C-RNTI received in a CORESET for beam failure recovery or link reconfiguration. The UE could be configured a period for transmitting PUSCH with configured grant.

In one embodiment, the third DCI could indicate activation command of PUSCH with configured grant. The fourth DCI could indicate activation command of PUSCH with configured grant. The third DCI may comprise a field indicating the third SRI value. The fourth DCI may comprise a field indicating a fourth SRI value. The fourth SRI value could be associated with a fourth reference signal.

In one embodiment, if the UE receives the third DCI, the UE could transmit a PUSCH on a configured occasion for configured grant transmission. The UE could also transmit the third PUSCH on a configured occasion for configured grant transmission after the UE receives the third DCI. The UE may not transmit the fourth PUSCH with configured grant via using the same transmission precoder or spatial filter for transmitting the first reference signal.

In one embodiment, if the UE receives the fourth DCI indicating activation command of SPS PDSCH, the UE could transmit the PUSCH with configured grant via the same spatial filter for receiving the fourth reference signal.

Referring back to FIGS. 3 and 4, in one exemplary embodiment of a UE, the device 300 includes a program code 312 stored in the memory 310. The CPU 308 could execute program code 312 to enable the UE (i) to transmit a third PUSCH with configured grant using transmission precoder or spatial filter for transmitting a third reference signal, wherein the third reference signal is associated with a SRI value indicated by a third DCI, (ii) to transmit a RA preamble on a PRACH resource for beam failure recovery or link reconfiguration, wherein the PRACH resource is associated with a candidate reference signal, (iii) to receive a response via the same spatial filter for receiving the candidate reference signal during the BFR procedure, and (iv) to transmit, if the UE receives the response, a fourth PUSCH on configured occasions via using the same transmission precoder or spatial filter for transmitting the PRACH resource until the UE receives a fourth DCI. Furthermore, the CPU 308 can execute the program code 312 to perform all of the above-described actions and steps or others described herein.

Figure 17:
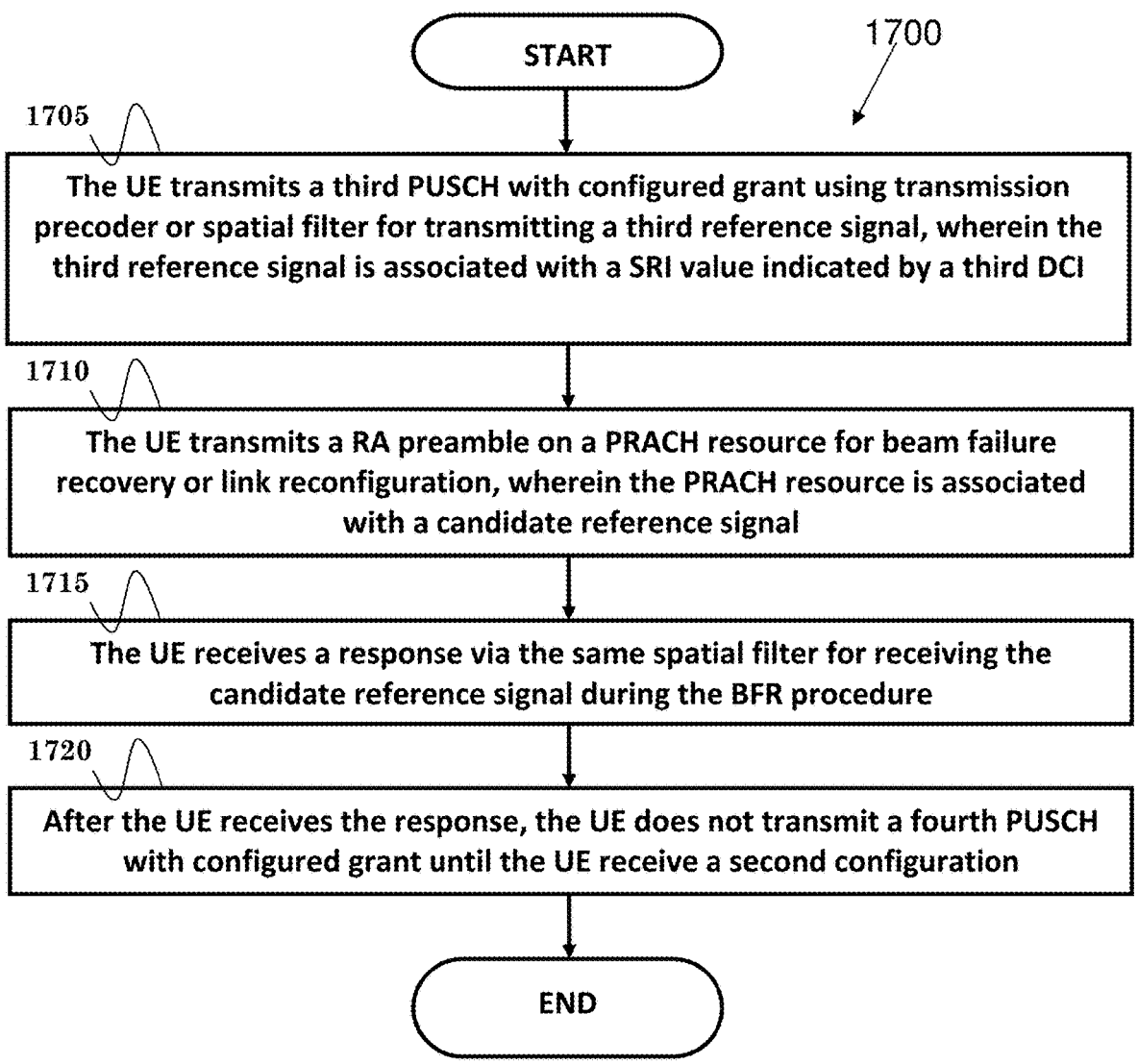
FIG. 17 is a flow chart according to one exemplary embodiment.

FIG. 17 is a flow chart 1700 according to one exemplary embodiment from the perspective of a UE. In step 1705, the UE transmits a third PUSCH with configured grant using transmission precoder or spatial filter for transmitting a third reference signal, wherein the third reference signal is associated with a SRI value indicated by a third DCI. In step 1710, the UE transmits a RA preamble on a PRACH resource for beam failure recovery or link reconfiguration, wherein the PRACH resource is associated with a candidate reference signal. In step 1715, the UE receives a response via the same spatial filter for receiving the candidate reference signal during the BFR procedure. In step 1720, after the UE receives the response, the UE does not transmit a fourth PUSCH with configured grant until the UE receive a second configuration.

In one embodiment, the response could be a DCI format with CRC scrambled by C-RNTI received in a CORESET for beam failure recovery or link reconfiguration. After the UE receives a fourth DCI, the UE could transmit PUSCH with configured grant based on the fourth DCI. The fourth DCI could indicate activation command of PUSCH with configured grant. The fourth DCI could be received after the response.

Referring back to FIGS. 3 and 4, in one exemplary embodiment of a UE, the device 300 includes a program code 312 stored in the memory 310. The CPU 308 could execute program code 312 to enable the UE (i) to transmit a third PUSCH with configured grant using transmission precoder or spatial filter for transmitting a third reference signal, wherein the third reference signal is associated with a SRI value indicated by a third DCI, (ii) to transmit a RA preamble on a PRACH resource for beam failure recovery or link reconfiguration, wherein the PRACH resource is associated with a candidate reference signal, (iii) to receive a response via the same spatial filter for receiving the candidate reference signal during the BFR procedure, and (iv) to transmit, after the UE receives the response, a fourth PUSCH with configured grant until the UE receive a second configuration. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE (User Equipment), comprising:
the UE receives a first configuration for PUSCH (Physical Uplink Shared Channel) transmission with configured grant, wherein the first configuration indicates a first sounding reference signal (SRS) resource indicator value, and the first SRS resource indicator (SRI) value is associated with a first reference signal;
the UE transmits a first PUSCH with configured grant by using a transmission precoder or a spatial filter, wherein the transmission precoder or the spatial filter is for transmitting the first reference signal;
the UE, in response to detecting beam failure recovery, transmits a RA (Random Access) preamble on a PRACH (Physical Random Access Channel) resource for beam failure recovery, wherein the PRACH resource is associated with a candidate reference signal;
the UE monitors and/or receives a response corresponding to the RA preamble via one or more antenna port quasi co-location parameters associated with the candidate reference signal during the BFR (Beam Failure Recovery) procedure; and
in response to the UE receiving the response, the UE transmits a second PUSCH with configured grant on occasions configured in the first configuration via using the same transmission precoder or spatial filter for transmitting the PRACH resource until the UE receives a second configuration comprising SRI for PUSCH transmission with configured grant.

2. The method of claim 1, wherein after the UE receives the second configuration, the UE transmits PUSCH with configured grant based on the second configuration.

3. The method of claim 1, wherein the first configuration indicates at least one of a plurality of periodical occasions for the UE to transmit PUSCH with configured grant.

4. The method of claim 1, wherein the second configuration indicates a configuration for PUSCH transmission with configured grant.

5. The method of claim 1, wherein the second configuration indicates a second SRI value.

6. A method for a UE (User Equipment), comprising:
the UE receives a first configuration for PUSCH (Physical Uplink Shared Channel) transmission with configured grant, wherein the first configuration indicates a first sounding reference signal (SRS) resource indicator value, and the first SRS resource indicator (SRI) value is associated with a first reference signal;
the UE transmits a first PUSCH with configured grant by using a transmission precoder or a spatial filter, wherein the transmission precoder or the spatial filter is for transmitting the first reference signal;
the UE, in response to detecting beam failure recovery, transmits a RA (Random Access) preamble on a PRACH (Physical Random Access Channel) resource for beam failure recovery, wherein the PRACH resource is associated with a candidate reference signal;
the UE monitors and/or receives a response corresponding to the RA preamble via one or more antenna port quasi co-location parameters associated with the candidate reference signal during the BFR (Beam Failure Recovery) procedure; and
after the UE receives the response, the UE does not transmit a second PUSCH with configured grant until the UE receives a second configuration comprising SRI for PUSCH transmission with configured grant.

7. The method of claim 6, wherein after the UE receives the second configuration, the UE transmits PUSCH with configured grant based on the second configuration.

8. The method of claim 6, wherein the first configuration indicates at least one of a plurality of periodical occasions for the UE to transmit PUSCH with configured grant.

9. The method of claim 6, wherein the second configuration indicates a configuration for PUSCH transmission with configured grant.

10. The method of claim 6, wherein the second configuration indicates a second SRI value.

11. A method of a UE (User Equipment), comprising:
the UE receives a first configuration for PUSCH (Physical Uplink Shared Channel) transmission with configured grant, wherein the first configuration indicates a first sounding reference signal (SRS) resource indicator value, and the first SRS resource indicator (SRI) value is associated with a first reference signal;
the UE transmits a first PUSCH with configured grant by using a transmission precoder or a spatial filter, wherein the transmission precoder or the spatial filter is for transmitting the first reference signal;
the UE, in response to detecting beam failure recovery, transmits a RA (Random Access) preamble on a PRACH (Physical Random Access Channel) resource for beam failure recovery, wherein the PRACH resource is associated with a candidate reference signal;
the UE monitors and/or receives a response corresponding to the RA preamble via one or more antenna port quasi co-location parameters associated with the candidate reference signal during the BFR (Beam Failure Recovery) procedure; and
in response to the UE the response, the UE transmits a second PUSCH with configured grant on an occasion configured in the first configuration via using the same transmission precoder or spatial filter for transmitting the PRACH resource.

12. The method of claim 11, wherein if the UE receives the response, the UE transmits a second PUSCH with configured grant on an occasion configured in the first configuration via using the same transmission precoder or spatial filter for transmitting the PRACH resource until the UE receives a second configuration for PUSCH transmission with configured grant.

13. The method of claim 11, wherein the UE does not receive a second configuration comprising SRI for PUSCH transmission with configured grant before the occasion, wherein the occasion is located after the response.

14. The method of claim 11, wherein an occasion configured in configuration for PUSCH with configured grant is a timing at which the UE transmits PUSCH with configured grant on time and/or frequency resources configured in configuration for PUSCH with configured grant.

15. The method of claim 11, wherein after the UE receives the second configuration, the UE transmits PUSCH with configured grant based on the second configuration.

16. The method of claim 11, wherein the first configuration indicates at least one of a plurality of periodical occasions for the UE to transmit PUSCH with configured grant.

17. The method of claim 11, wherein the second configuration indicates configuration for PUSCH transmission with configured grant.

18. The method of claim 11, wherein the second configuration indicates a second SRI value.

* * * * *